US012808484B2

(12) United States Patent
Numata et al.

(10) Patent No.: US 12,808,484 B2
(45) Date of Patent: Nov. 24, 2026

(54) POWER TOOL

(71) Applicant: MAKITA CORPORATION, Anjo (JP)

(72) Inventors: Fumitoshi Numata, Anjo (JP); Takumi Hayashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/329,064

(22) Filed: Sep. 15, 2025

(65) Prior Publication Data

US 2026/0085787 A1 Mar. 26, 2026

(30) Foreign Application Priority Data

Sep. 25, 2024 (JP) ................................ 2024-165986
Sep. 25, 2024 (JP) ................................ 2024-165987

(51) Int. Cl.
*B25F 5/02* (2006.01)
*B25G 1/10* (2006.01)
*F16P 3/18* (2006.01)

(52) U.S. Cl.
CPC *F16P 3/18* (2013.01); *B25F 5/02* (2013.01); *B25G 1/10* (2013.01)

(58) Field of Classification Search
CPC ... B25F 5/00; B25F 5/02; B25F 5/026; B25G 1/10; F16P 3/18
See application file for complete search history.

(56) References Cited

U.S. PATENT DOCUMENTS 12,030,170 B2 * 7/2024 Kaneko ................. B24B 23/028
2021/0205976 A1 * 7/2021 Matei ....................... G08B 7/06
2021/0328399 A1 * 10/2021 Radtke ...................... B25F 5/02
2022/0055166 A1 * 2/2022 Dennis ............... B23Q 11/0092
2023/0139444 A1 * 5/2023 Kok ..................... H03K 17/955 324/686

(Continued)

FOREIGN PATENT DOCUMENTS

WO WO-2008009624 A1 * 1/2008 ................ F16P 3/18

OTHER PUBLICATIONS

A machine translation of WO-2008009624-A1 (Year: 2008).*

*Primary Examiner* — Himchan Song
(74) *Attorney, Agent, or Firm* — Oliff PLC

(57) ABSTRACT

A power tool includes a housing, a handle, and a connector. The housing includes a housing-side coupling portion having conductive properties. The handle includes a conductive handle-side coupling portion, a detecting portion capable of detecting a detection value, a handle-side conducting portion electrically connected to the detecting portion, and an insulating portion that electrically insulates the handle-side coupling portion from the handle-side conducting portion. The connector includes a main body portion having insulating properties, and a housing-side conducting portion attached to the main body portion and electrically connected to the detection circuit. In a state in which the handle-side coupling portion is coupled to the housing-side coupling portion, the handle-side conducting portion is electrically connected to the housing-side conducting portion, and the housing-side conducting portion is electrically insulated from the housing-side coupling portion by the main body portion.

15 Claims, 13 Drawing Sheets

(56) References Cited

U.S. PATENT DOCUMENTS

| | | | | |
|---|---|---|---|---|
| 2023/0158658 | A1* | 5/2023 | Ghouse | B25F 5/02 81/489 |
| 2023/0166379 | A1* | 6/2023 | Suzuki | B24B 23/02 310/50 |
| 2023/0170902 | A1* | 6/2023 | Koschel | B24B 23/028 173/1 |
| 2024/0278377 | A1* | 8/2024 | Ropella | B25F 5/001 |
| 2024/0308052 | A1* | 9/2024 | Bowers | B24B 23/005 |

* cited by examiner

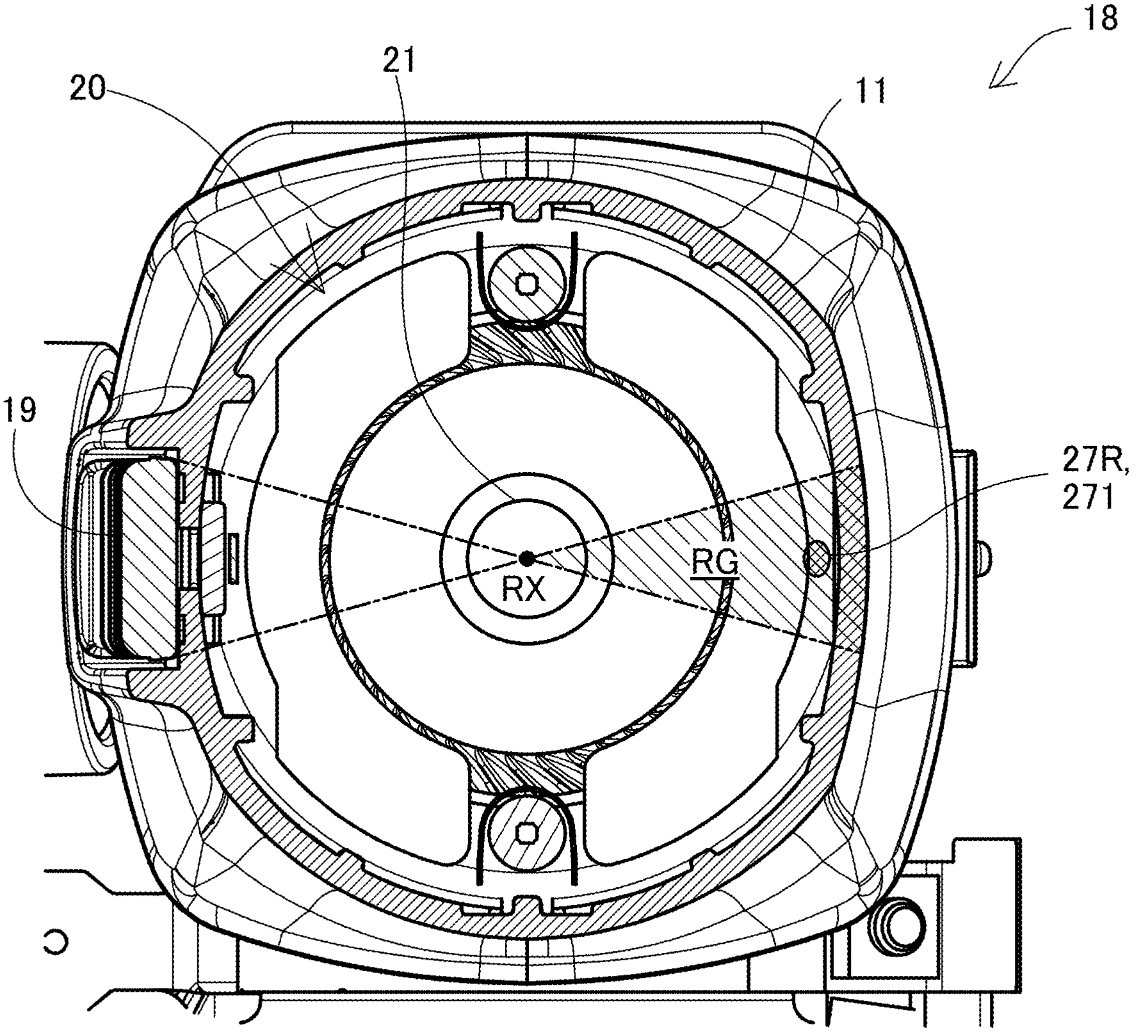
Fig.4
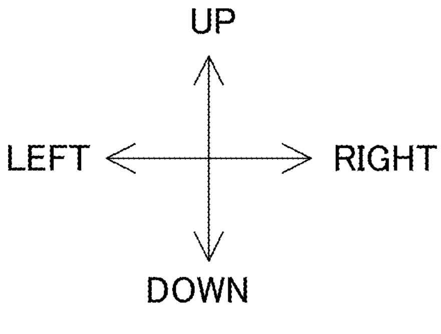

POWER TOOL

CROSS-REFERENCE TO RELATED APPLICATION

The present application claims priority to Japanese patent application No. 2024-165986 and 2024-165987, both of which were filed on Sep. 25, 2024. The contents of the foregoing applications are hereby fully incorporated herein by reference.

TECHNICAL FIELD

The present disclosure relates to a power tool.

BACKGROUND

A power tool is known on which a detecting portion that detects given information indicating a state of the power tool is provided on a handle configured to be attachable and detachable to and from a housing. In a state of the handle being attached to the housing, the detecting portion and a detection circuit provided on the housing are electrically connected to each other. For example, in US 2023-0158658 A1, a handle is disclosed that includes a screw portion for coupling to a coupling portion on the housing side, and a conducting portion for being electrically connected to the detecting portion. In this power tool, the conducting portion is formed on the screw portion, and when the handle is coupled to the housing via the screw portion, the detecting portion is configured to be electrically connected to the detection circuit via the screw portion.

SUMMARY

In the known technology, since the conducting portion is formed on the screw portion, when the coupling portion on the housing side is made of metal, the housing and the detecting portion have the same electrical potential via the coupling portion, and there is a possibility that the housing and the detecting portion may become electrically connected to each other. In this case, there is a possibility that a detection accuracy, by the detecting portion and the detection circuit, as to whether or not the handle has been gripped may deteriorate.

The present disclosure can be realized as the following aspects.

A power tool according to a first aspect of the present disclosure is provided. The power tool includes a housing including at least one housing-side coupling portion having conductive properties and a handle gripped by a user. The handle includes a handle-side coupling portion detachably coupled to the at least one housing-side coupling portion, the handle-side coupling portion having conductive properties. The handle includes a detecting portion capable of detecting a detection value, a handle-side conducting portion electrically connected to the detecting portion, and an insulating portion electrically insulating the handle-side coupling portion from the handle-side conducting portion. The power tool includes at least one connector. The connector includes a main body portion configured to be fixable to the housing, the main body portion having insulating properties, and a housing-side conducting portion attached to the main body portion and electrically connected to a detection circuit, the detection circuit acquiring the detection value from the detecting portion. In a state in which the handle-side coupling portion and the at least one housing-side coupling portion are coupled to each other, the handle-side conducting portion is electrically connected to the housing-side conducting portion. The housing-side conducting portion is electrically insulated from the at least one housing-side coupling portion by the main body portion.

According to the power tool according to the above-described aspect, in a state in which the handle is attached to the housing, the housing-side conducting portion is insulated from the housing-side coupling portion by the main body portion, and it is thus possible to suppress or prevent a short circuit between the housing-side conducting portion and the detecting portion at a connection location between the handle-side conducting portion and the housing-side conducting portion. Thus, it is possible to suppress or prevent a deterioration in a detection accuracy of gripping of the handle.

The present disclosure can be realized by various modes other than the power tool. For example, the disclosure can be realized using a mode including a grinder, a grip detection method of a power tool, a control method of the power tool, a computer program that realizes the control method, and a non-transitory storage medium or the like storing the computer program.

BRIEF DESCRIPTION OF THE DRAWINGS

FIG. 4 is a cross-sectional view at a position IV-IV shown in FIG. 3.

DETAILED DESCRIPTION OF THE EMBODIMENTS

Figure 1:
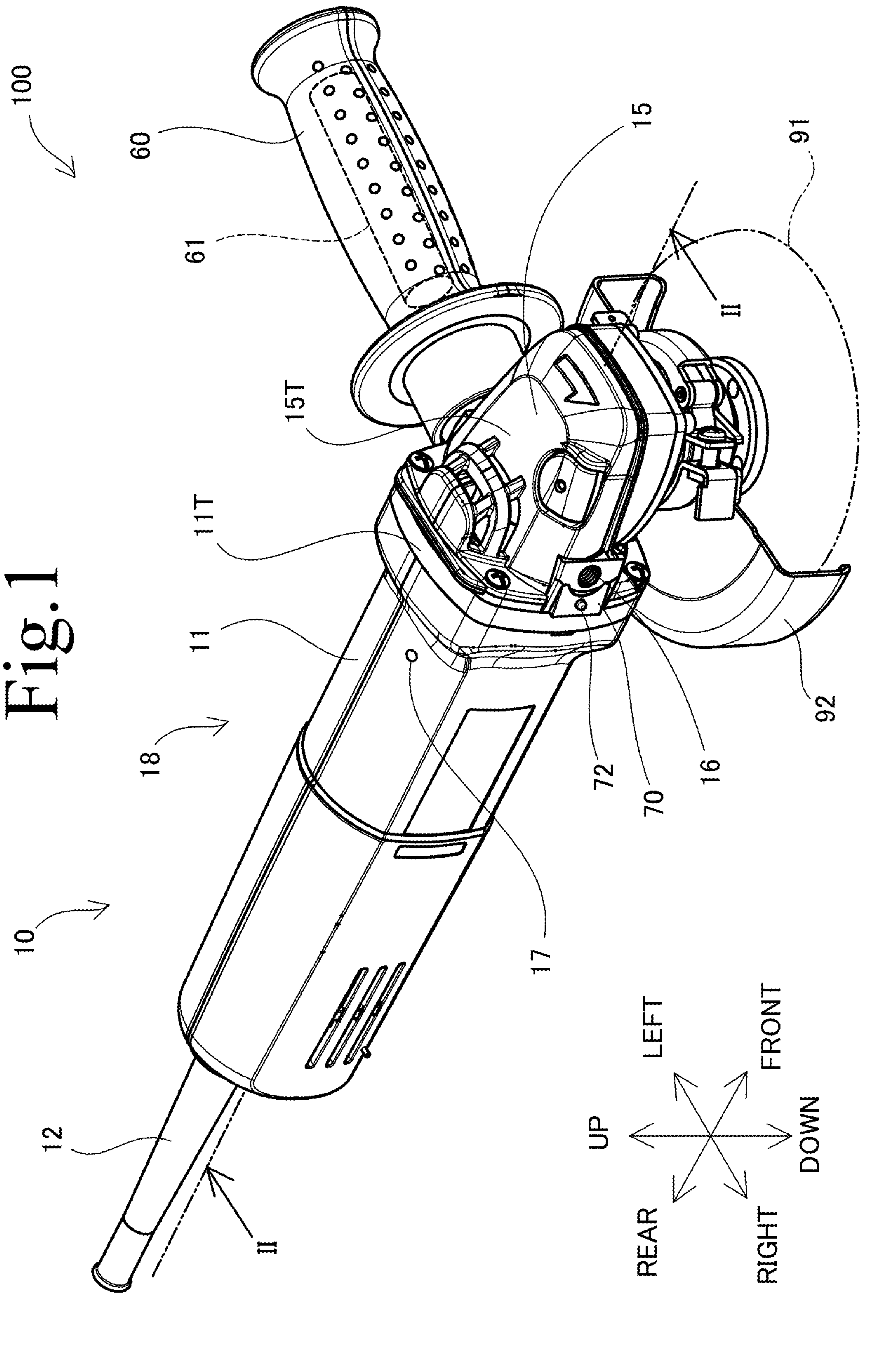
FIG. 1 is a perspective view showing an external configuration of a grinder.

In a non-limiting embodiment of the present disclosure, in a state in which the handle-side coupling portion and the at least one housing-side coupling portion are coupled together, the handle-side conducting portion may be provided at a position facing a surface of the main body portion. The at least one connector may further include a biasing member configured to bias the housing-side conducting portion to protrude from the surface of the main body portion toward the handle-side conducting portion.

According to this embodiment, the housing-side conducting portion is in contact with the housing-side conducting portion in a state of being biased toward the handle-side conducting portion by the biasing member. Thus, for example, it is possible to suppress or prevent chattering from occurring at a contact point between the housing-side conducting portion and the handle-side conducting portion, due to vibrations or the like caused by a machining operation of the power tool.

In addition to the above-described embodiment, or in place of the above-described embodiment, the at least one connector may further include a plate housed in the main body portion and having conductive properties. The plate may be electrically connected to the detection circuit. The biasing member may have conductive properties, may be disposed on the plate, and may electrically connect the housing-side conducting portion and the plate. As a result of the biasing member biasing the housing-side conducting portion in a direction separating from the plate, the housing-side conducting portion may be configured to protrude from the surface of the main body portion toward the handle-side conducting portion.

According to this configuration, by using the plate having the conductive properties, a contact surface area with the biasing member can be increased. Thus, while biasing the housing-side conducting portion using the biasing member on the plate, the housing-side conducting portion and the detection circuit can be electrically connected to each other in a favorable manner via the plate.

In addition to the above-described embodiment, or in place of the above-described embodiment, the handle-side coupling portion may be a male screw or a female screw. The at least one housing-side coupling portion may be a male screw or a female screw configured to be screwable together with the handle-side coupling portion. The handle-side conducting portion may have an annular shape disposed surrounding the handle-side coupling portion in a state of being separated from the handle-side coupling portion.

According to this embodiment, even when the handle is coupled together with the housing by being screwed together, and a rotation position of the handle with respect to the housing changes, the handle-side conducting portion and the housing-side conducting portion can be caused to be electrically connected with each other regardless of the rotation position of the handle.

In addition to the above-described embodiment, or in place of the above-described embodiment, the handle-side conducting portion may be disposed at a position separated from a surface of the housing, in the state in which the handle-side coupling portion and the at least one housing-side coupling portion are coupled to each other. According to this embodiment, in a state in which the handle is mounted to the housing, the handle-side conducting portion can be separated from the surface of the housing. Thus, it is possible to suppress or prevent the handle-side conducting portion from being damaged as a result of the handle-side conducting portion coming into contact with the surface of the housing when mounting the handle to the housing. Further, when the housing has conductive properties, it is possible to suppress or prevent a short circuit from occurring between the handle-side conducting portion and the housing.

In addition to the above-described embodiment, or in place of the above-described embodiment, the at least one connector may include a plurality of connectors. The at least one housing-side coupling portion may include a plurality of housing-side coupling portions. The main body portions of the respective plurality of connectors may be provided at positions corresponding to the respective plurality of housing-side coupling portions.

According to this embodiment, regardless of which of the housing-side coupling portions the handle is coupled to, the detecting portion of the handle and the detection circuit can be easily electrically connected to each other via the connector.

In addition to the above-described embodiment, or in place of the above-described embodiment, a part of the housing-side conducting portion may be housed in the main body portion. The main body portion may include a plurality of through holes, a lead wire being insertable through the plurality of through holes, and the lead wire electrically connecting the part of the housing-side conducting portion housed in the main body portion to the detection circuit.

According to this embodiment, as a result of including the plurality of through holes, the housing-side conducting portion and the lead wire can be easily electrically connected to each other, compared to a mode in which the single through hole is included.

In addition to the above-described embodiment, or in place of the above-described embodiment, the housing-side conducting portion may be a metal pin having a long axis. The main body portion may have a plane-symmetrical shape with respect to a plane including the long axis. The plurality of through holes may include two through holes respectively disposed in two regions divided by the plane including the long axis.

According to this embodiment, compared to a mode in which the connector has a non-symmetrical shape, it is possible to reduce or prevent a failure caused by an operator making an error in an attachment position of the connector when fixing the connector to the housing. Further, by using the connector having the same shape, it is possible to improve manufacturing productivity of the connector.

In addition to the above-described embodiment, or in place of the above-described embodiment, a tip end of the housing-side conducting portion may have a curved surface shape.

According to this embodiment, compared to a case in which the tip end of the housing-side conducting portion is a flat surface, it is possible to suppress or prevent the handle-side conducting portion from being damaged by the tip end of the housing-side conducting portion, even when the housing-side conducting portion comes into contact with the handle-side conducting portion as a result of being biased by the biasing member.

A. FIRST EMBODIMENT

A1. Configuration of Power Tool

A representative and non-limiting embodiment of the present disclosure will be described in detail with reference to the drawings. In the following embodiment, a hand-held electric disc grinder 100 (hereinafter also simply referred to as the "grinder 100") is described as an example of a "power tool" according to the present disclosure. Note, however, that the power tool is not limited to only the grinder 100, and may be a power tool other than the grinder 100, such as a hammer drill, a driver drill, a belt sander, a chainsaw, or the like.

As shown in FIG. 1, the grinder 100 includes a housing 10 that includes a main handle 18, and a sub handle 60 that is configured to be grippable by a user. The sub handle 60 is detachably coupled to the housing 10. An electrode 61 that can detect an electrostatic capacitance is provided inside the sub handle 60. The sub handle 60 is an example of a "sub handle", and a "handle", and the electrode 61 is an example of a "second detecting portion". The electrostatic capacitance detected by the electrode 61 is an example of a "second detection value". The configuration of the sub handle 60 will be described in detail below.

Figure 2:
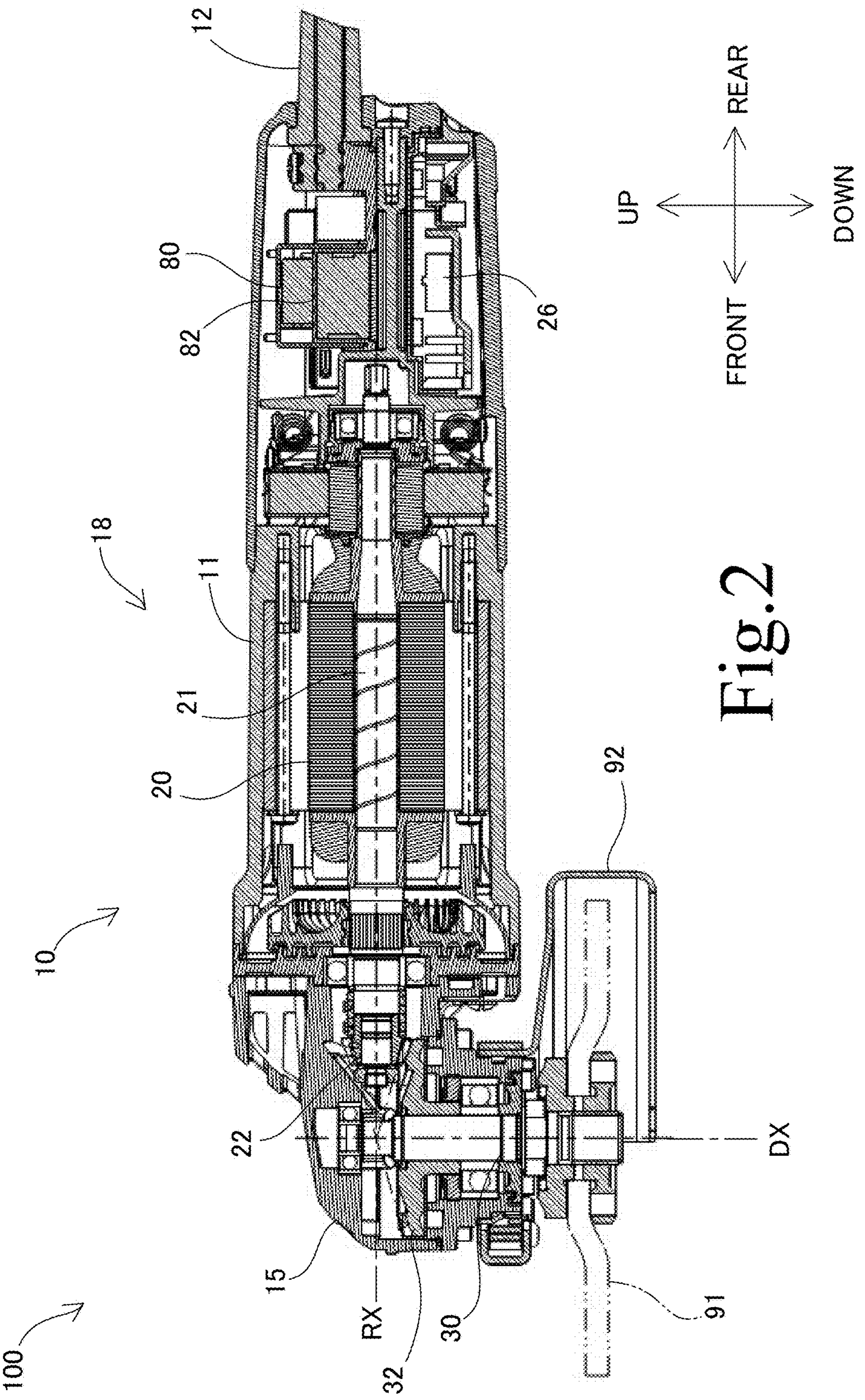
FIG. 2 is a cross-sectional view showing an internal configuration of the grinder in a side view.

The housing 10 is a long-shaped hollow body, and forms an outer contour of the grinder 100. As shown in FIG. 2, a motor 20, and a spindle 30 are housed in the housing 10, the spindle 30 being operably coupled to an output shaft 21 of the motor 20.

The motor 20 is disposed such that a rotation axis RX of the output shaft 21 extends substantially in parallel to a long axis of the housing 10 and the main handle 18. In the present embodiment, the motor 20 operates as a result of power being delivered from an external AC power source, via a power cord 12 that extends from one end portion in a longitudinal direction of the housing 10. Note, however, that the motor 20 may be configured to operate as a result of power being delivered from a rechargeable battery detachably mounted to the housing 10.

The spindle 30 is disposed inside the other end portion in the longitudinal direction of the housing 10. The spindle 30 is supported inside the housing 10 so as to be able to rotate around a drive shaft DX. The drive shaft DX intersects the rotation axis RX of the output shaft 21. Note that, in the present embodiment, the drive shaft DX is orthogonal to the rotation axis RX. From this, the grinder is also sometimes referred to as an angle grinder.

As shown in FIG. 2, one end portion in an axial direction of the spindle 30 is exposed to the outside from the housing 10. A tip tool 91 is detachably attached to the one end portion of the spindle 30. Note that, as the tip tool 91 that can be mounted to the grinder 100, a grindstone, a cutting whetstone, a blade, a brush, or the like can be used, for example. The user selects the appropriate tip tool 91 in accordance with the content of a desired operation, and mounts the selected tip tool 91 to the grinder 100. The tip tool 91 is rotated in accordance with the spindle 30 being driven to rotate around the drive shaft DX by the motor 20, and a machining operation is thus performed on a workpiece. The grinder 100 can perform the machining operation of grinding, polishing, cutting, and the like on the workpiece, depending on the type of the tip tool 91. Note that the tip tool 91 is partially covered by a wheel cover 92 attached to the housing 10.

Hereinafter, for convenience of description, an extending direction of the drive shaft DX is defined as an up-down direction of the grinder 100. In the up-down direction, the one end side of the spindle 30 to which the tip tool 91 is attached is defined as the lower side of the grinder 100, and the opposite side is defined as the upper side of the grinder 100. An extending direction of the rotation axis RX of the output shaft 21 is defined as the front-rear direction of the grinder 100. In the front-rear direction, the side on which the spindle 30 is disposed is defined as the front side of the grinder 100, and the opposite side is defined as the rear side of the grinder 100. A direction orthogonal to the up-down direction and the front-rear direction is defined as a left-right direction of the grinder 100.

As shown in FIG. 1, the housing 10 includes a motor housing 11, and a gear housing 15 coupled to the front end of the motor housing 11.

The motor housing 11 is a housing including a long cylindrical portion extending in the front-rear direction. The motor housing 11 is configured to also function as the main handle 18 that can be gripped by the user. As shown in FIG. 2, the motor housing 11 houses the motor 20, a switch 26, a detection circuit 80, and a controller 82. The output shaft 21 of the motor 20 extends in the front-rear direction. The front end portion and the rear end portion of the output shaft 21 are respectively supported by bearings.

As shown in FIG. 2, the switch 26 is disposed to the rear of the motor 20 inside the housing 10. The switch 26 is coupled to a switch knob 19 shown in FIG. 3, and is configured to operate as a result of a slide operation of the switch knob 19. More specifically, the switch knob 19 moves between an OFF position and an ON position in accordance with a manual operation of the switch knob 19. The switch 26 switches between ON and OFF in accordance with the movement of the switch knob 19. The switch knob 19 is an example of an "operation portion". As will be described below, the motor 20 is driven during a period in which, when the main handle 18 and the sub handle 60 are being gripped, the switch 26 is further turned ON. Whether or not the switch 26 has been turned ON is an example of a "second condition". Note that the operation portion may be configured by a paddle switch, a snap switch, or the like, in place of the switch knob 19.

Figure 3:
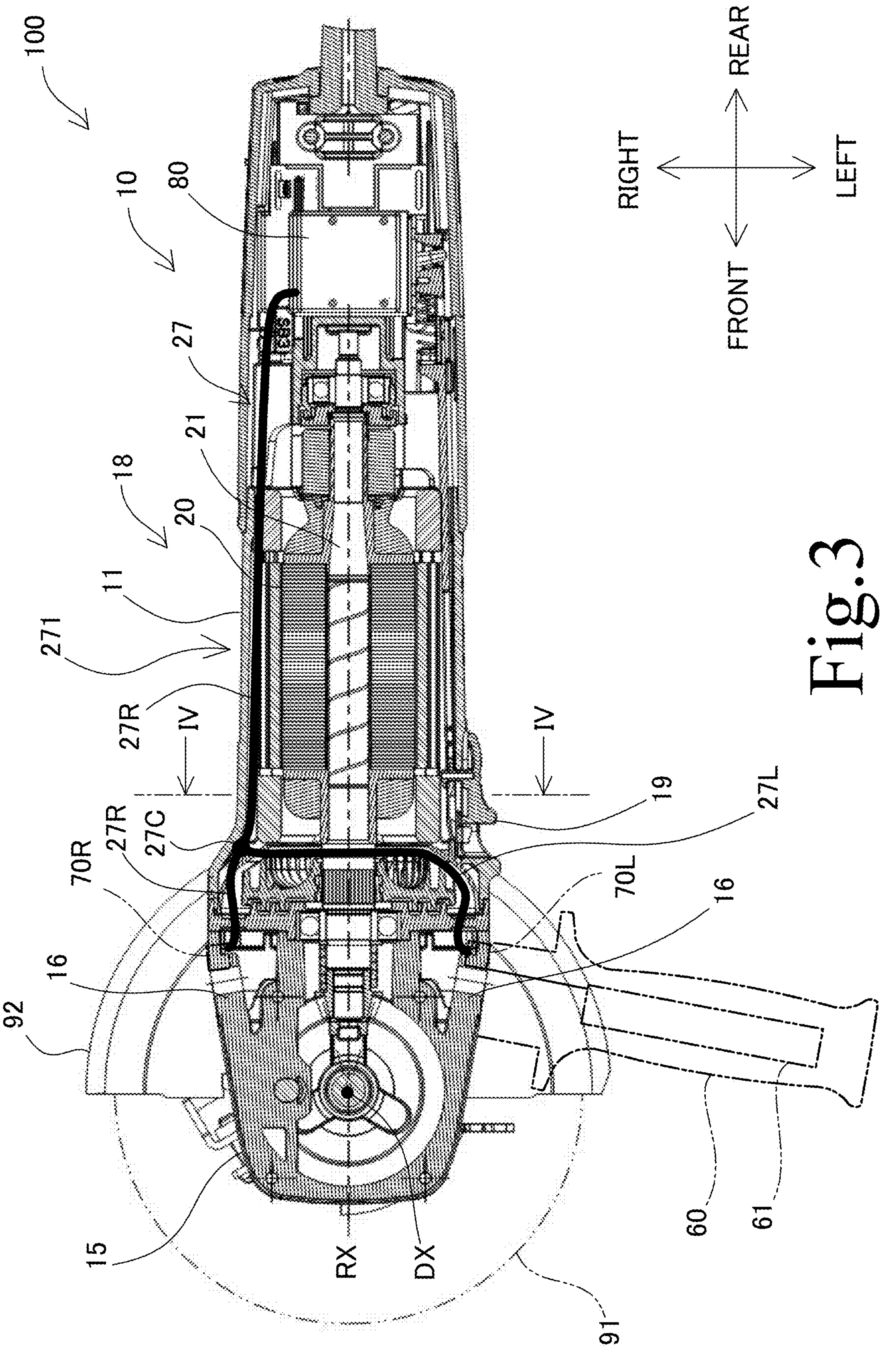
FIG. 3 is a cross-sectional view showing the internal configuration of the grinder in a plan view.

As shown in FIG. 3, the switch knob 19 is disposed on the outside of the housing 10. In the present embodiment, the switch knob 19 is provided at the left side surface of the main handle 18. By adopting this kind of configuration, even when gripping the main handle 18 from the upper side, the user's finger easily reaches the switch knob 19, and the user can easily manually operate the switch knob 19. Note that, in the present embodiment, for example, a mechanical brake device, such as a friction-type brake device or the like, is housed in the motor housing 11. When the switch knob 19 is at the OFF position, the brake device brakes the output shaft 21 and the spindle 30.

As shown in FIG. 2, the gear housing 15 houses the spindle 30. Note that the gear housing 15 is made of metal, and has conductive properties. The spindle 30 is a shaft having a long substantially circular pillar shape. The spindle 30 is disposed inside the gear housing 15 so as to extend in the up-down direction, and is supported by a plurality of bearings so as to be able to rotate around the drive shaft DX. A driven bevel gear 32 is fixed to the upper portion of the spindle 30. The front end portion of the output shaft 21 of the motor 20 protrudes into the gear housing 15, and a drive bevel gear 22, which meshes with the driven bevel gear 32, is fixed to the section of the output shaft 21 that protrudes into the gear housing 15.

When the motor 20 is driven, the rotation of the output shaft 21 is transmitted to the spindle 30, and the spindle 30 is driven to rotate. As a result, the tip tool 91 fixed to the spindle 30 is driven to rotate in a specific rotation direction. Note that, in the present embodiment, the rotation direction of the spindle 30 is the clockwise direction in a plan view.

As shown in FIG. 1, a housing-side coupling portion 16 that can be coupled with the sub handle 60 is formed on the housing 10. In the present embodiment, the housing-side coupling portion 16 is formed on the outer surface of the gear housing 15. The housing-side coupling portion 16 is a female screw corresponding to a handle-side coupling portion 67 to be described below.

As shown in FIG. 3, in the present embodiment, two of the housing-side coupling portions 16 are formed on the housing 10 (more specifically, on the gear housing 15). For example, the orientation of the housing 10 when the grinder 100 is used may be switched depending on the type of the tip tool 91, such as a method of use in which the lower side of the housing 10 is disposed on the lower side in the vertical direction, and a method of use in which the left side of the housing 10 is disposed on the lower side in the vertical direction. When the orientation of the power tool is switched by the user, from the point of view of improving the convenience for the user, it is preferable that an attachment position of the sub handle 60 can be changed in accordance with the orientation of the housing 10. With the grinder 100 according to the present embodiment, the plurality of the housing-side coupling portions 16 are provided on the housing 10, and a configuration is thus adopted in which the attachment position of the sub handle 60 can be easily changed.

In the present embodiment, the two housing-side coupling portions 16 are respectively provided on the right side and the left side of the housing 10. In the example shown in FIG. 1, the sub handle 60 is coupled to the housing-side coupling portion 16 provided on the left side of the housing 10. Note that the number of the housing-side coupling portions 16 is not limited to being two, and the single housing-side coupling portion 16 may be provided. Further, the housing 10 may include a desired number of the housing-side coupling portions 16, such as three or more. In this case, in addition to being provided on the right side and the left side of the housing 10, the housing-side coupling portion 16 may be further provided on the upper side of the housing 10, such as at an upper side apex 15T of the gear housing 15, or an upper side apex 11T of the motor housing 11, both of which are shown in FIG. 1.

As shown in FIG. 1, in the present embodiment, a connector 70 is attached in the vicinity of the housing-side coupling portion 16. The connector 70 is electrically connected to the electrode 61 of the sub handle 60 when the sub handle 60 is coupled to the housing-side coupling portion 16, and to the detection circuit 80 inside the housing 10. The configuration of the connector 70 will be described in detail below.

In the present embodiment, the grinder 100 includes two of the connectors 70. More specifically, the grinder 100 includes the number of the connectors 70 corresponding to the number of the housing-side coupling portions 16. The two connectors 70 are provided at positions corresponding to each of the two housing-side coupling portions 16. By adopting this configuration, when the plurality of housing-side coupling portions 16 are provided in the grinder 100, the electrode 61 of the sub handle 60 and the detection circuit 80 inside the housing 10 can easily be electrically connected to each other via the connector 70 when the sub handle 60 is coupled to either of the housing-side coupling portions 16.

As shown in FIG. 2, the detection circuit 80 is disposed at the rear end portion of the housing 10, and is electrically connected to the controller 82. The detection circuit 80 includes an oscillation circuit, a resonance circuit, a wave detection circuit, an amplifier circuit, and the like. As will be described below, the detection circuit 80 acquires an electrostatic capacitance from the electrode 61 provided in the sub handle 60. For example, when the sub handle 60 is gripped by the user, the electrostatic capacitance between the electrode 61 and the hand of the user gripping the sub handle 60 changes with respect to the electrostatic capacitance when the sub handle 60 is not being gripped. The detection circuit 80 converts a resonance frequency, which has changed in accordance with the change in the electrostatic capacitance, to a voltage, and outputs the voltage to the controller 82. The detection circuit 80 acquires an electrostatic capacitance from a first detecting portion 271, as will be described below. The first detecting portion 271 is provided in the main handle 18, and detects the electrostatic capacitance of the main handle 18. The first detecting portion 271 is an example of a "first detecting portion". The detection circuit 80 converts a total electrostatic capacitance acquired from the electrode 61 and the first detecting portion 271 to a voltage, and outputs the voltage to the controller 82. The electrostatic capacitance detected by the first detecting portion 271 is an example of a "first detection value". The voltage output from the detection circuit 80 to the controller 82 is an example of a "detection result".

As shown in FIG. 2, the controller 82 is disposed in the rear end portion of the housing 10. The controller 82 is configured by a CPU as a processor, a memory including a ROM, a RAM, and the like, and a computer including a timer and the like. As a result of the CPU reading out and executing programs stored in the memory, the controller 82 executes various functions realized by the grinder 100 according to the present embodiment.

For example, based on the changes in the electrostatic capacitance, the controller 82 executes grip detection processing that determines whether or not both the sub handle 60 and the main handle 18 are being gripped. Specifically, the controller 82 compares the detection result (a voltage value in the present embodiment) acquired from the detection circuit 80 with a threshold value stored in the memory. Based on a comparison result, the controller 82 detects whether or not the sub handle 60 and the main handle 18 are being gripped. In the present embodiment, when the controller 82 determines that the sub handle 60 and the main handle 18 are being gripped, the controller 82 allows the driving of the motor 20. A setting method of the threshold value will be described below.

The grinder 100 according to the present embodiment further includes a notification portion 17, on the upper surface of the main handle 18. The notification portion 17 is configured using LED lighting, for example. In accordance with the detection result as to whether or not the sub handle 60 and the main handle 18 are being gripped, the controller 82 lights or extinguishes the LED lighting. As a result, the user can ascertain whether or not the sub handle 60 and the main handle 18 are being appropriately gripped.

A2. Arrangement Configuration of Lead Wire 27

FIG. 3 schematically shows a lead wire 27 disposed inside the housing 10. As shown in FIG. 3, the lead wire 27 is electrically connected to the detection circuit 80 and each of the connectors 70. The lead wire 27 is a part of a connection path electrically connecting the electrode 61 and the detection circuit 80. In this way, via the lead wire 27 and the connector 70, the detection circuit 80 is electrically connected to the electrode 61 of the sub handle 60 attached to the housing 10.

As shown in FIG. 3, in the present embodiment, the lead wire 27 is disposed so as to pass through the main handle 18. By adopting this configuration, a section of the lead wire 27 that passes through the main handle 18 functions as the first detecting portion 271 that can detect the electrostatic capacitance in the main handle 18.

In the present embodiment, the detection circuit 80 is provided in the rear end portion of the motor housing 11. Thus, the section of the lead wire 27 that can function as the first detecting portion 271 is longer in the front-rear direction compared to a case in which the detection circuit 80 is provided in a central portion of the motor housing 11, for example. As a result, it is possible to detect the gripping over a wider range in the front-rear direction.

Here, the connector 70 provided on the right side of the housing 10 is defined as a "connector 70R", and the connector 70 provided on the left side of the housing 10 is defined as a "connector 70L". In the present embodiment, the lead wire 27 includes a long lead wire 27R that connects from the connector 70R to the detection circuit 80, and a lead wire 27L that is connected to the lead wire 27R at a wiring connection position 27C. The lead wire 27L connects from the connector 70L to the wiring connection position 27C. In other words, the single lead wire connected to the detection circuit 80 is configured to branch into two wires from the wiring connection position 27C toward each of the connectors 70L and 70R. By adopting this type of configuration, the detection circuit 80 and the electrode 61 can be electrically connected to each other, both when the sub handle 60 is mounted to the connector 70L and to the connector 70R.

In the present embodiment, the wiring connection position 27C between the lead wire 27R and the lead wire 27L is disposed in the front end portion of the main handle 18. More specifically, the wiring connection position 27C is disposed further to the front side than the motor 20 inside the housing 10. By adopting this type of configuration, the wiring connection position 27C can shorten an overall length of the lead wire 27 compared to a case in which the wiring connection position 27C is disposed further to the rear side than the motor 20. Further, by specifying the position at which the lead wire 27 passes through the main handle 18 at a single location, the position at which the gripping of the main handle 18 is detected can be specified at the desired single location.

FIG. 4 shows a cross-section of the main handle 18 cut in a plane that passes through the switch knob 19 and is orthogonal to the long axis of the main handle 18. Note that the long axis of the main handle 18 is substantially aligned with the rotation axis RX of the output shaft 21. In the present embodiment, the lead wire 27 is disposed at a position close to the outer surface of the main handle 18, in the interior of the main handle 18. By adopting this type of configuration, accuracy of grip detection of the main handle 18 by the first detecting portion 271 can be improved.

As shown in FIG. 4, in the present embodiment, of the cylindrical main handle 18, the lead wire 27 is disposed in a region RG on the opposite side from the switch knob 19, with the rotation axis RX interposed therebetween. The "region RG on the opposite side from the switch knob 19, with the rotation axis RX interposed therebetween" is, for example, a collection of coordinates passing through lines joining each of portions of the switch knob 19 and the rotation axis RX, on the opposite side of the rotation axis RX from the switch knob 19. In this way, the first detecting portion 271 is disposed at a position separated from the switch knob 19. By adopting this type of configuration, in a state in which the gripping of the main handle 18 is detected by the first detecting portion 271, and in which the switch knob 19 can be manually operated, it is possible to estimate that this is a state in which the main handle 18 is reliably gripped over a range roughly from the switch knob 19 to the first detecting portion 271. Thus, compared to a mode in which the first detecting portion 271 is disposed close to the switch knob 19, it is possible to detect a state in which the user is gripping the surrounding of the main handle 18, not only touching part of the main handle 18.

A3. Configuration of Sub Handle 60

Figure 5:
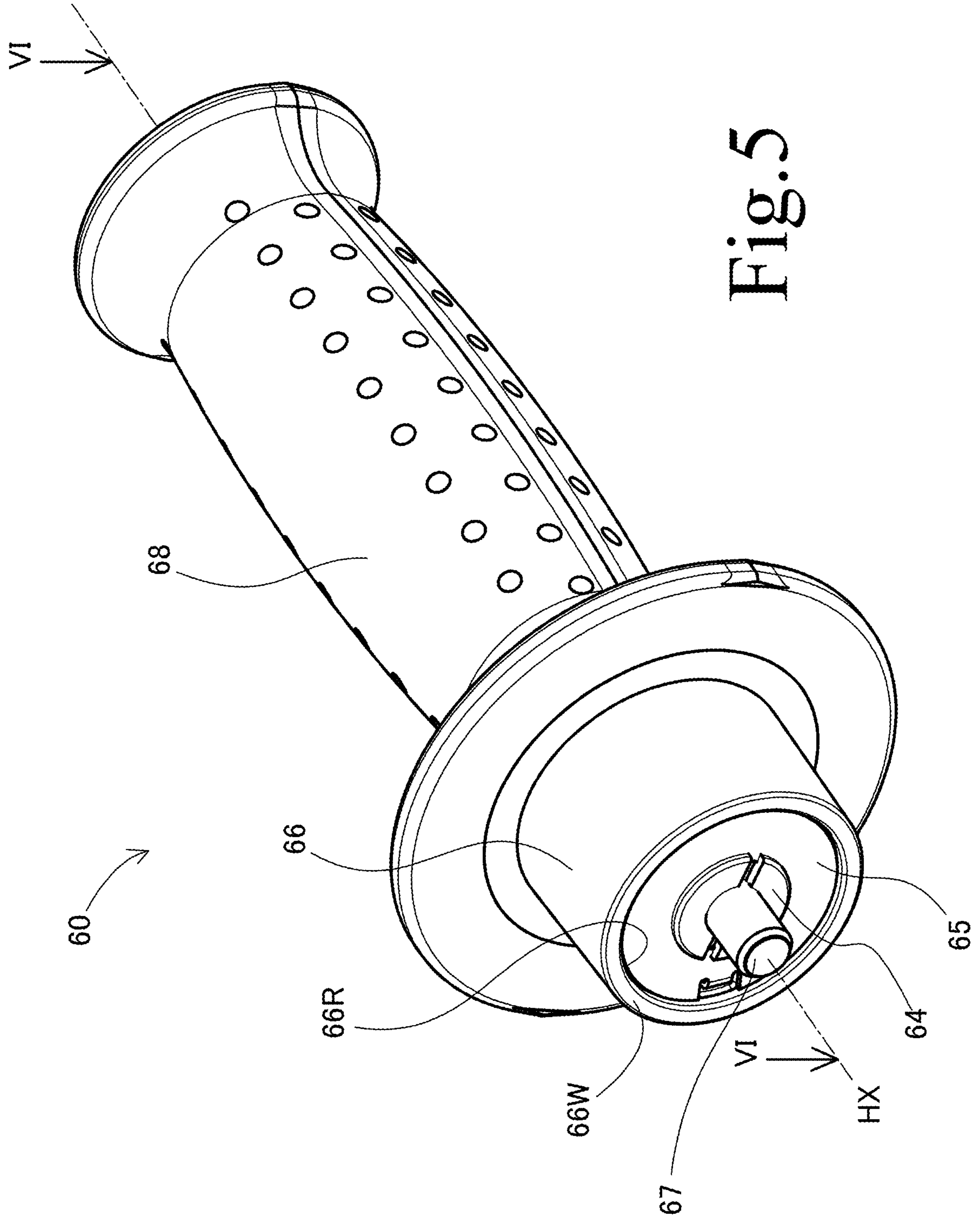
FIG. 5 is a perspective view showing an external configuration of a sub handle.
Figure 6:
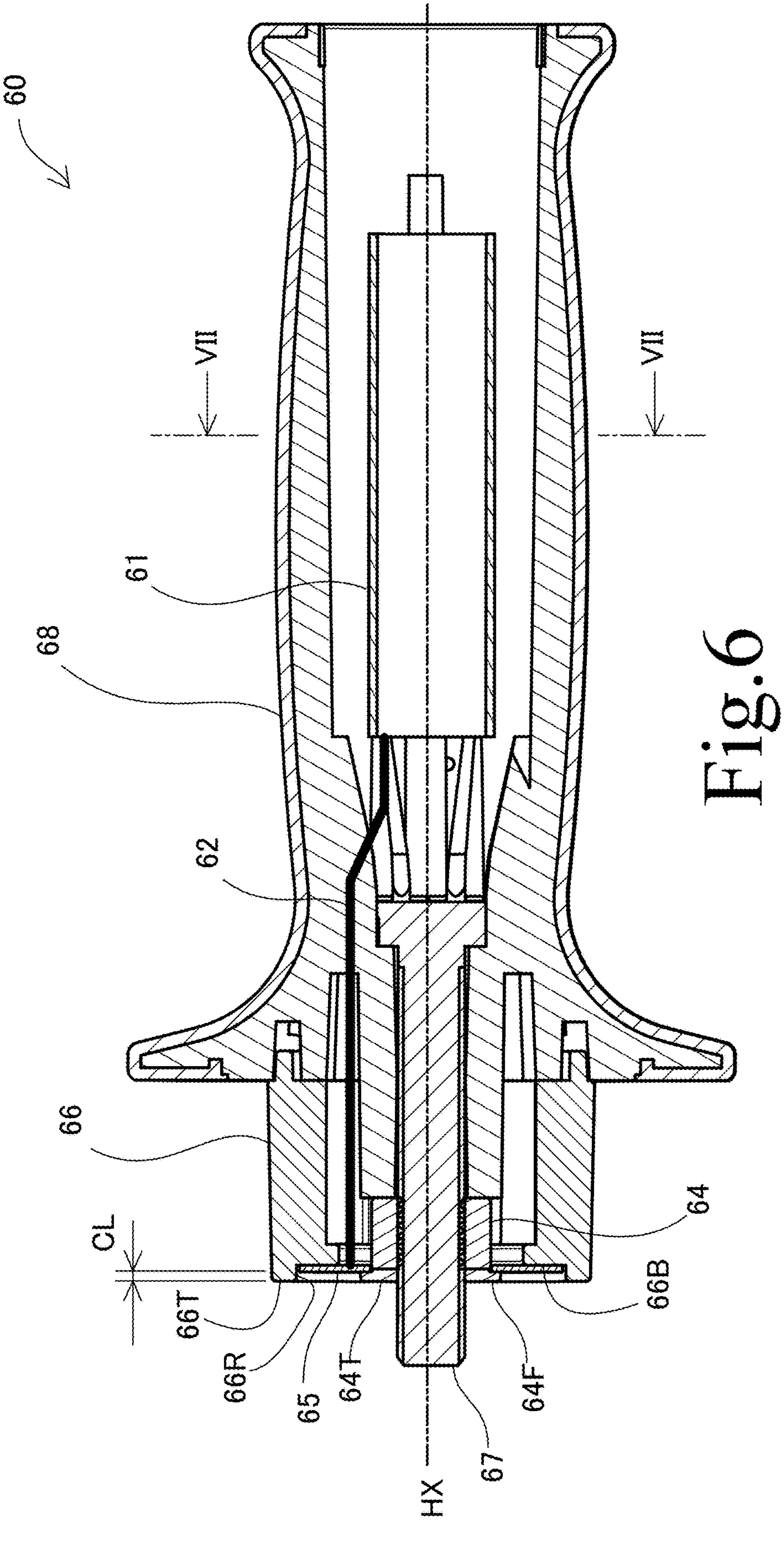
FIG. 6 is a cross-sectional view at a position VI-VI shown in FIG. 5.

As shown in FIG. 5 and FIG. 6, the sub handle 60 includes a main body portion 68, a support body 66, the handle-side coupling portion 67, an insulating portion 64, a handle-side conducting portion 65, the electrode 61, and a handle-side lead wire 62.

The main body portion 68 has a substantially circular cylindrical shape that extends along a long axis HX, and is configured to be grippable by the user. The main body portion 68 is an example of a "grip portion". As shown in FIG. 6, the electrode 61 and a part of the handle-side coupling portion 67 are disposed inside the main body portion 68.

As shown in FIG. 6, the handle-side coupling portion 67 is a male screw configured to be able to be screwed together with the housing-side coupling portion 16 of the housing 10. The handle-side coupling portion 67 is fixed inside the main body portion 68 so as to extend along the long axis HX. In the present embodiment, the handle-side coupling portion 67 is formed using a metal material. As described above, since the housing-side coupling portion 16 is also made using a metal material, when the handle-side coupling portion 67 is coupled to the housing-side coupling portion 16, the housing-side coupling portion 16 and the handle-side coupling portion 67 have the same electrical potential as each other. Note that when the housing-side coupling portion 16 is a male screw, the handle-side coupling portion 67 may be configured as a female screw.

As shown in FIG. 6, the support body 66 has a substantially circular cylindrical shape extending along the long axis HX. The support body 66 is formed using an insulating material, and is connected to the main body portion 68. In the state in which the sub handle 60 is mounted to the housing 10, a tip end portion 66T of the support body 66 faces the housing 10. A wall portion 66W that extends toward the side of the housing 10, and a bottom portion 66B that is surrounded by the wall portion 66W are formed on the tip end portion 66T of the support body 66, at a peripheral edge portion of the tip end portion 66T. The handle-side conducting portion 65 is disposed in a recess portion 66R defined by the bottom portion 66B and the wall portion 66W.

The handle-side conducting portion 65 is a metal plate having a substantially annular shape. As shown in FIG. 6, the handle-side conducting portion 65 is electrically connected to the electrode 61, via the handle-side lead wire 62. As will be described in more detail below, in the state in which the sub handle 60 is mounted to the housing 10, the handle-side conducting portion 65 is configured to be disposed facing the housing 10 and the connector 70, and to come into contact with a conducting pin 72 protruding from the connector 70.

In the present embodiment, by disposing the handle-side conducting portion 65 in the recess portion 66R of the support body 66, a clearance CL is formed between the surface of the handle-side conducting portion 65 and a tip end of the wall portion 66W at the tip end portion 66T of the support body 66. By adopting this type of configuration, in the state in which the sub handle 60 is mounted to the housing 10, the handle-side conducting portion 65 can be disposed at a position separated from the surface of the housing 10 (refer to FIG. 10). Thus, for example, it is possible to suppress or prevent a short circuit from occurring between the handle-side conducting portion 65 and the gear housing 15 or the like.

As shown in FIG. 5, in the present embodiment, the handle-side conducting portion 65 has the substantially annular shape surrounding the handle-side coupling portion 67. Here, in the grinder 100 according to the present embodiment, the sub handle 60 is mounted to the housing 10 as a result of the handle-side coupling portion 67 and the housing-side coupling portion 16 being screwed together. When being mounted to the housing 10, the sub handle 60 rotates around the long axis HX with respect to the housing 10 and the connector 70. Thus, a relative position of the handle-side conducting portion 65 with respect to the conducting pin 72 protruding from the connector 70 changes in accordance with a rotation position of the sub handle 60.

In the present embodiment, since the handle-side conducting portion 65 is formed in the annular shape, the handle-side conducting portion 65 is configured to overlap a rotational orbit of the conducting pin 72 with respect to the handle-side coupling portion 67, when the handle-side coupling portion 67 and the housing-side coupling portion 16 are being screwed together. By adopting this type of configuration, the handle-side conducting portion 65 and the conducting pin 72 can be caused to come into contact with each other regardless of the rotation position of the sub handle 60 with respect to the housing 10. Thus, when the sub handle 60 is mounted to the housing 10 by being screwed together, it is possible to suppress or prevent a defect occurring in which the handle-side conducting portion 65 and the conducting pin 72 do not come into contact with each other and the electrode 61 and the detection circuit 80 are not electrically connected to each other.

As shown in FIG. 6, in order to be insulated from the handle-side coupling portion 67, the handle-side conducting portion 65 is disposed in a state of being separated from the handle-side coupling portion 67. In the present embodiment, by disposing the insulating portion 64 between the handle-side conducting portion 65 and the handle-side coupling portion 67, a configuration is adopted in which the handle-side conducting portion 65 and the handle-side coupling portion 67 are insulated from each other.

The insulating portion 64 is a member having a substantially circular cylindrical shape formed using an insulating material. A female screw corresponding to the male screw formed on the handle-side coupling portion 67 is formed in an inner peripheral surface of the insulating portion 64. The insulating portion 64 is screwed together with the handle-side coupling portion 67 and is fixed so as to surround a part of the handle-side coupling portion 67. With the simple configuration using the insulating portion 64, it is possible to suppress or prevent a short circuit from occurring between the handle-side conducting portion 65 and the handle-side coupling portion 67.

A flange portion 64F, which protrudes in a direction separating further away from the long axis HX than other members, namely, which protrudes to an outer side in a radial direction, is formed on a tip end portion 64T of the insulating portion 64. By screwing together the handle-side coupling portion 67 and the insulating portion 64 in a state in which the handle-side conducting portion 65 is disposed in the recess portion 66R of the support body 66, the handle-side conducting portion 65 is fixed in place by being sandwiched between the bottom portion 66B of the support body 66 and the flange portion 64F of the insulating portion 64.

Note that a length of the clearance CL is substantially the same as a thickness of the flange portion 64F, for example. Thus, as shown in FIG. 6, the tip end portion 64T of the insulating portion 64 is in substantially the same plane as the tip end of the wall portion 66W at the tip end portion 66T of the support body 66. As a result, when the sub handle 60 is mounted to the housing 10, of the sub handle 60, the wall portion 66W of the support body 66, and the tip end portion 64T of the insulating portion 64 are the first portions to come into contact with the outer surface of the gear housing 15. In other words, a configuration is adopted in which locations at which an insulating body is formed on the sub handle 60 come into contact with the outer surface of the metal gear housing 15. By adopting this type of configuration, it is possible to prevent the gear housing 15 and the electrode 61 from having the same electrical potential as each other.

Figure 7:
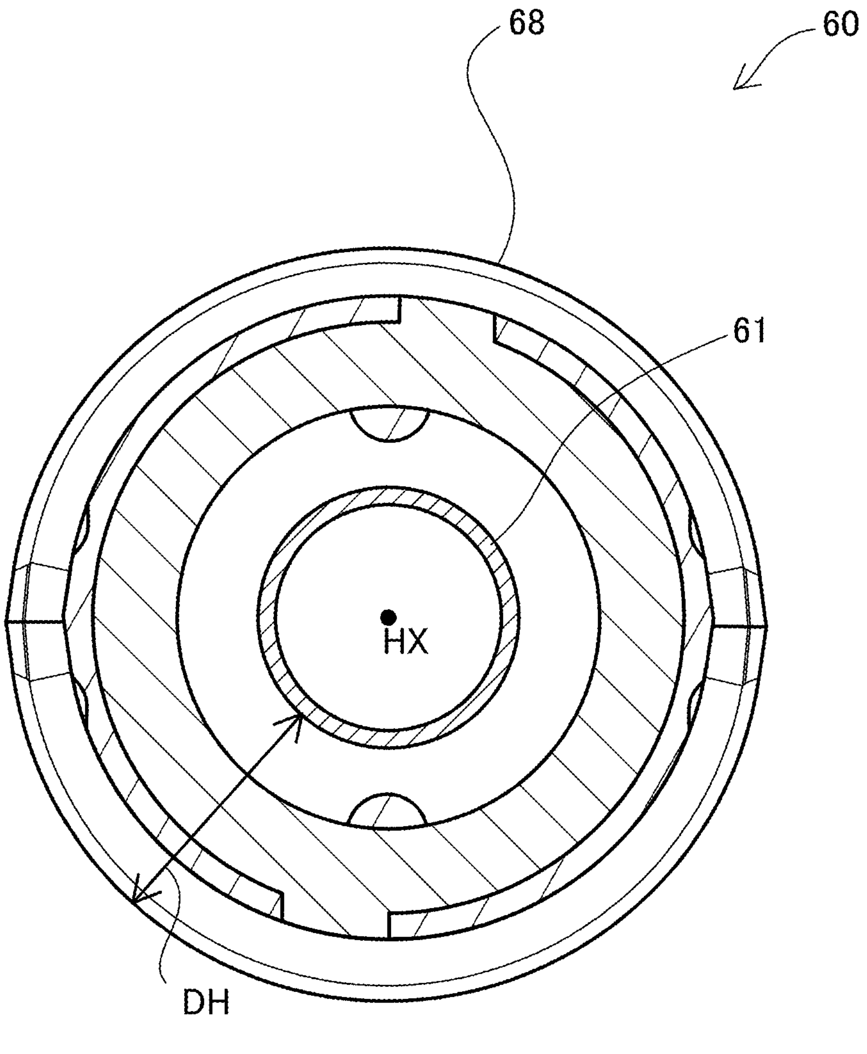
FIG. 7 is a cross-sectional view at a position VII-VII shown in FIG. 6.

As shown in FIG. 6 and FIG. 7, the electrode 61 has a substantially circular cylindrical shape extending along the long axis HX. The electrode 61 is disposed so as to surround the long axis HX of the sub handle 60, and is configured to be able to detect the electrostatic capacitance over the entire circumference of the main body portion 68 of the sub handle 60.

Further, as shown in FIG. 7, in the present embodiment, a distance DH in the radial direction of the sub handle 60 from the electrode 61 to the outer surface of the main body portion 68 is configured to be substantially the same over the entire circumference of the sub handle 60 centered on the long axis HX. Thus, there is effectively no anisotropy in relation to a circumferential direction of the long axis HX in terms of a detection sensitivity of the electrostatic capacitance by the electrode 61. As a result, even when the rotation position of the sub handle 60 with respect to the housing 10 changes due to the screwing together of the housing 10 and the sub handle 60, it is possible to suppress the detection sensitivity of the electrostatic capacitance by the electrode 61 from changing in accordance with the rotation position. Further, it is possible to suppress or prevent an influence on the detection sensitivity of the electrostatic capacitance caused by differences in a gripping position of the sub handle 60 by the user. In other words, when fixing the sub handle 60 at a specific position of the housing 10 by screwing the sub handle 60 and the housing 10 together or the like, even when the orientation or posture of the sub handle 60 changes each time the sub handle 60 is attached or detached, it is possible to detect the gripping of the sub handle 60 regardless of the orientation and posture of a grip portion with respect to the housing 10.

A4. Configuration of Connector 70

Figure 8:
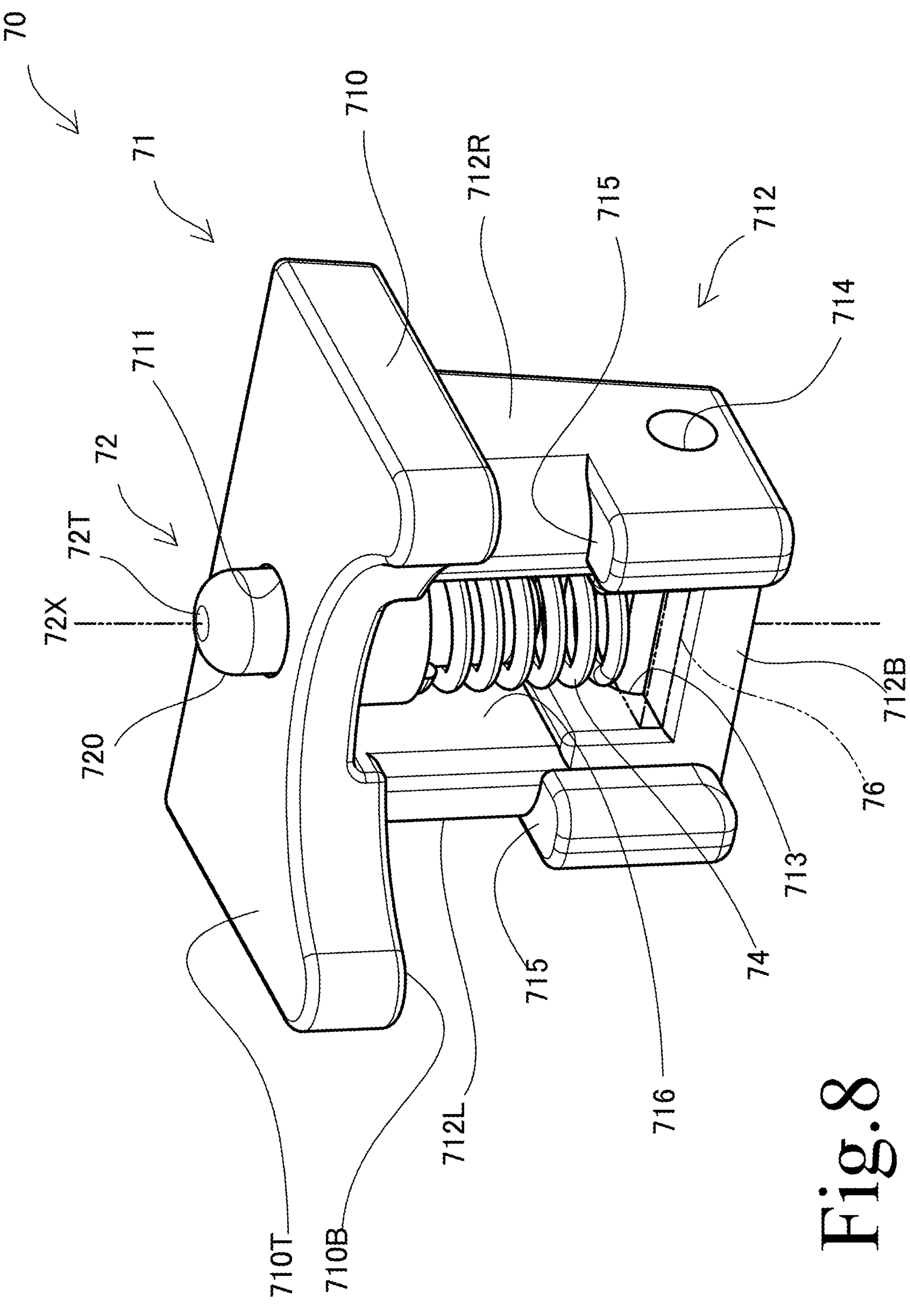
FIG. 8 is a perspective view showing an external configuration of a connector.

As described above, the connector 70 is electrically connected to the electrode 61 of the sub handle 60 coupled to the housing 10, via the housing-side coupling portion 16, and to the detection circuit 80 inside the housing 10. As shown in FIG. 8, the connector 70 includes a main body portion 71, the conducting pin 72, a spring 74, and a conducting plate 76.

The main body portion 71 is formed of a resin material, for example, and has insulating properties. The main body portion 71 includes a plate portion 710, and a storage portion 712 extending from the plate portion 710.

The plate portion 710 includes a facing surface 710T, and a bottom surface 710B on the opposite side from the facing surface 710T. A through hole 711 that penetrates from the facing surface 710T to the bottom surface 710B is formed at the center of the facing surface 710T. In a state in which the connector 70 is attached to the housing 10 (specifically, to the gear housing 15), the facing surface 710T is exposed to the outside from the housing 10 and faces the sub handle 60.

In the state in which the connector 70 is attached to the housing 10, the storage portion 712 is housed inside the housing 10. The storage portion 712 includes two side walls 712R and 712L contiguous to the bottom surface 710B, and a bottom wall 712B connected between the two side walls 712R and 712L. The bottom wall 712B is disposed facing the bottom surface 710B of the plate portion 710.

As shown in FIG. 8, a recess portion 715 is provided in each of the two side walls 712R and 712L by forming a cutout in part of each of the side walls 712R and 712L. The recess portions 715 fix the main body portion 71 to the housing 10 as a result of being latched or fitted to the housing 10.

Figure 9:
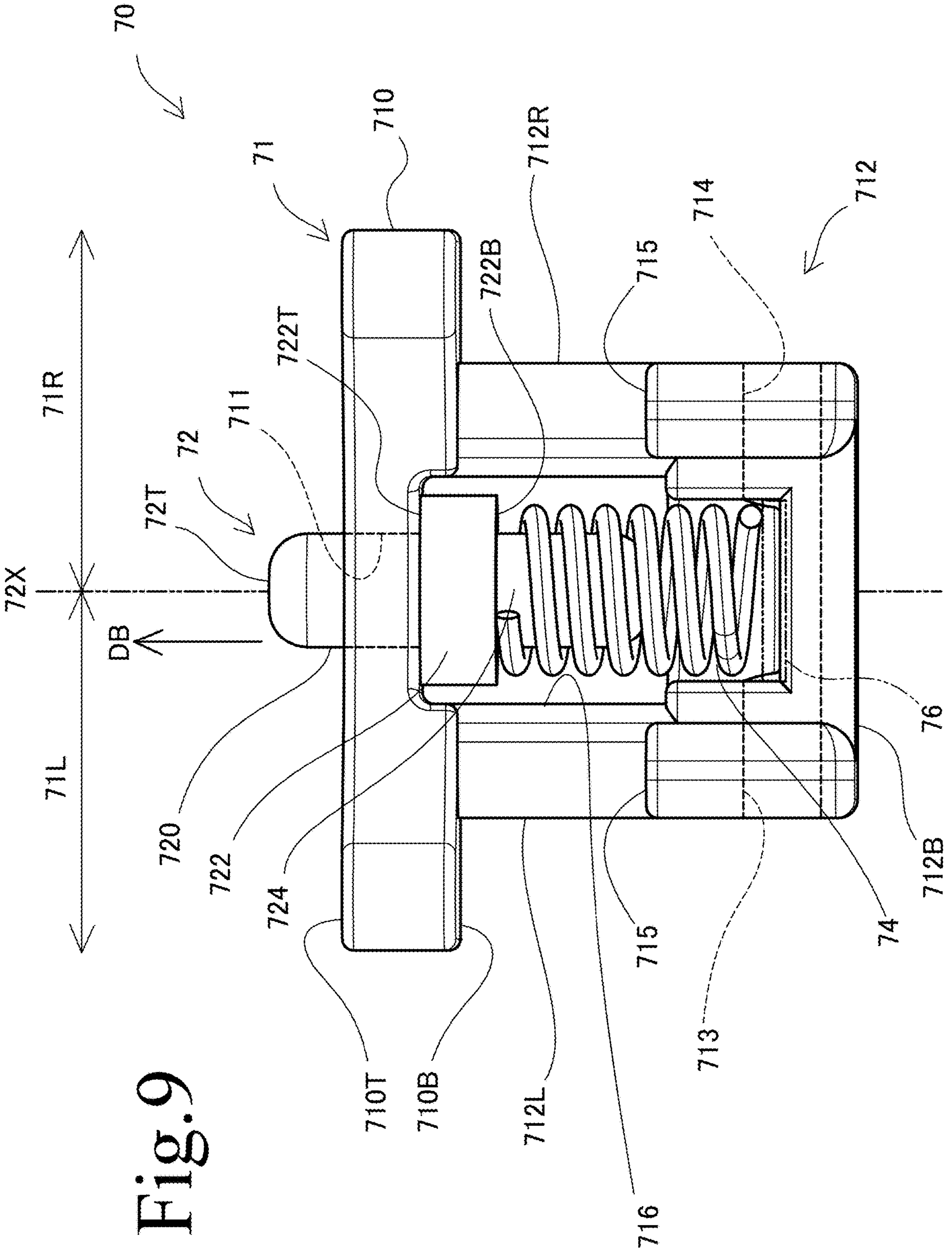
FIG. 9 is a front view showing the configuration of the connector.

As shown in FIG. 9, a storage space 716 is formed at substantially the center of the main body portion 71, the storage space 716 being defined by the two side walls 712R and 712L, the bottom wall 712B, and the bottom surface 710B. The storage space 716 houses a part of the conducting pin 72, the spring 74, and the conducting plate 76.

The conducting plate 76 is a plate member that has conductive properties, for example. The conducting plate 76 is electrically connected to the lead wire 27 by welding, deposition, bonding, or the like.

A through hole 714 that penetrates to one side from the storage space 716, and a through hole 713 that penetrates toward the opposite side to the through hole 714 from the storage space 716, are respectively formed in the two side walls 712R and 712L. Specifically, the through hole 713 is formed in the side wall 712L, and the through hole 714 is formed in the side wall 712R. The through holes 713 and 714 connect an arrangement position of the conducting plate 76 in the storage space 716 with the outside of the main body portion 71.

The through holes 713 and 714 are configured such that the lead wire 27 can be inserted therethrough. Due to the main body portion 71 including the plurality of through holes 713 and 714, it is possible to guide the lead wire 27 to the storage space 716 from a plurality of positions on the outside of the connector 70. Thus, compared to a case in which the main body portion 71 has only a single through hole, the conducting pin 72 and the lead wire 27 can be easily electrically connected with each other. When the connectors 70 are attached to a plurality of positions of the housing 10, a relative position of the lead wire 27 disposed inside the housing 10 and the connector 70 differs for each of arrangement positions of the connectors 70. Due to the main body portion 71 including the plurality of through holes 713 and 714, the lead wire 27 is more easily guided from the outside of the connector 70 to the storage space 716, and universality of the arrangement position of the connector 70 with respect to the housing 10 can be improved. Note that the number of the through holes is not limited to being two, and may be the single through hole, or may be a desired number such as three or more.

As shown in FIG. 9, the main body portion 71 has a plane-symmetrical shape with respect to a plane including a long axis 72X. Thus, the connector 70 can easily be disposed at a plurality of positions of the housing 10, such as the right side, the left side, the center, and the like of the housing 10.

Further, the through holes 713 and 714 are also disposed at positions having plane symmetry with respect to the plane including the long axis 72X. As shown in FIG. 9, when two regions divided by the plane including the long axis 72X are a region 71L and a region 71R, respectively, the through hole 713 is included in the region 71L and the through hole 714 is included in the region 71R. Due to having the plane-symmetrical shape, the connector 70 having the same shape can easily be disposed at different positions of the housing 10. Thus, compared to a format in which the connector 70 not having the plane-symmetrical shape is employed, an operator can omit a process of determining an attachment position of the connector 70 per connector 70. As a result, it is possible to reduce or prevent a failure caused by the operator making an error in the attachment position of the connector 70. Further, it is possible to manufacture the connectors 70 having the same shape, and it is thus possible to improve manufacturing productivity of the connector 70.

As shown in FIG. 9, the conducting pin 72 is a rod-shaped member including the long axis 72X. The conducting pin 72 is formed of a metal material or the like, and has conductive properties. The conducting pin 72 is an example of a "housing-side conducting portion" and a "pin". The conducting pin 72 is formed by an outside protruding portion 720, a flange portion 722, and an inside protruding portion 724 being contiguous to each other along the long axis 72X.

The outside protruding portion 720 is inserted into the through hole 711 of the plate portion 70, and protrudes toward the outside from the facing surface 710T of the main body portion 71. The inside protruding portion 724 is disposed in the storage space 716, and is inserted into the spring 74. The flange portion 722 is disposed between the outside protruding portion 720 and the inside protruding portion 724, and is configured such that the diameter thereof is larger than that of the outside protruding portion 720 and the inside protruding portion 724.

The spring 74 is a compression coil spring, for example. The spring 74 is an example of a "biasing member". The spring 74 is formed of a metal material, and has conductive properties. In a state in which the spring 74 is disposed on the conducting plate 76, the spring 74 biases the conducting pin 72 in a biasing direction DB. The biasing direction DB is a direction in which the conducting pin 72 protrudes to the outside from the facing surface 710T (a direction separating from the conducting plate 76), and is a direction in which the conducting pin 72 is directed toward the handle-side conducting portion 65. The biasing direction DB is parallel to the long axis 72X. As a result of being biased in the biasing direction DB by the spring 74, the outside protruding portion 720 of the conducting pin 72 protrudes from the surface of the main body portion 71. As a result of the surface 722T that is contiguous to the outside protruding portion 720 of the flange portion 722 coming into contact with the bottom surface 710B, the movement of the outside protruding portion 720 in the biasing direction DB is restricted.

Figure 10:
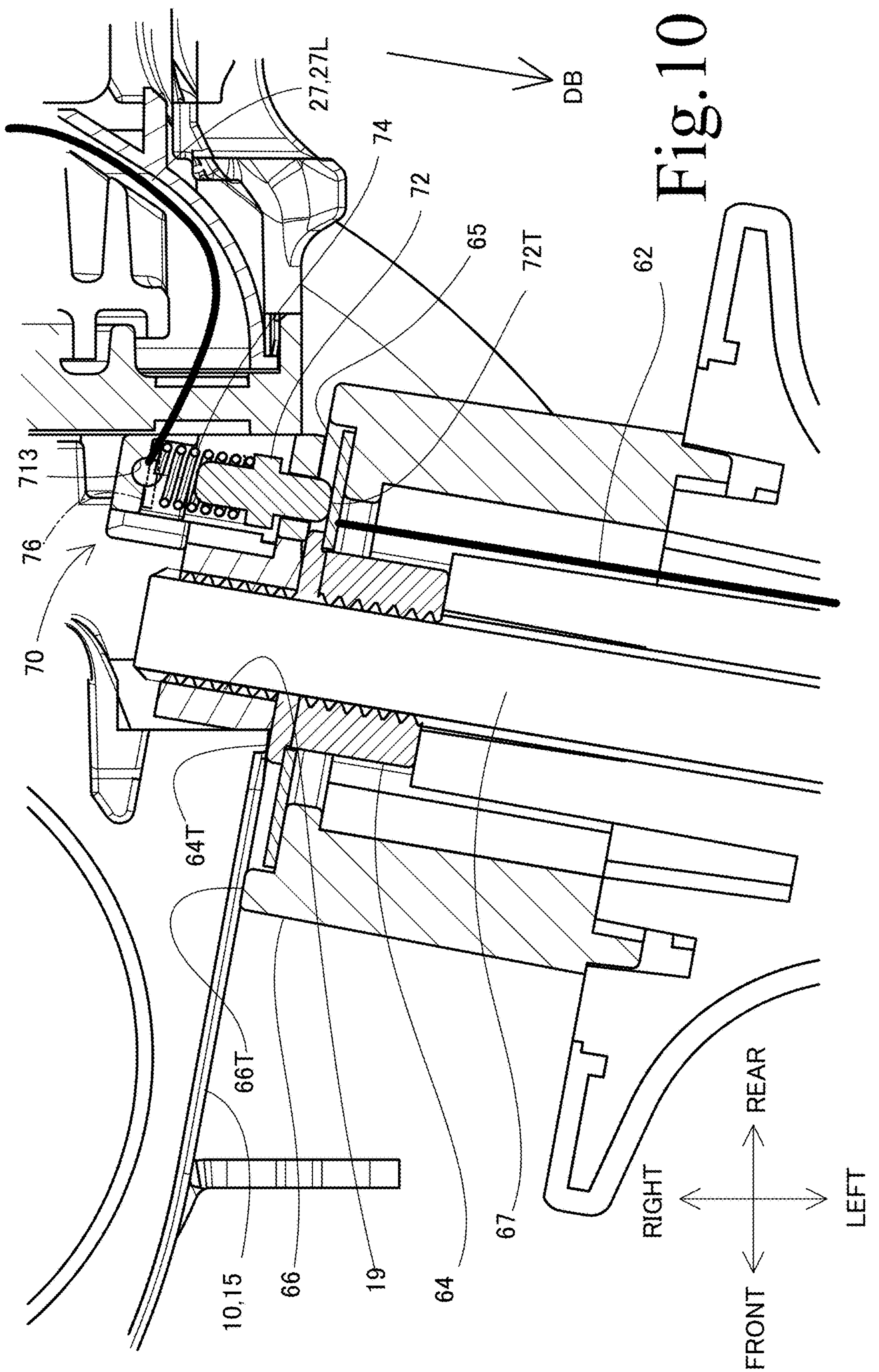
FIG. 10 is an explanatory diagram showing a state in which a handle-side conducting portion of the sub handle and a conducting pin of the connector are electrically connected to each other.

As shown in FIG. 10, inside the housing 10, the lead wire 27 is disposed so as to be guided from the detection circuit 80 to the connector 70. The lead wire 27 guided to the connector 70 is guided to the storage space 716 from the through hole 713 or the through hole 714 formed in the main body portion 71, and is electrically connected to the conducting plate 76.

As shown in FIG. 10, one end of the spring 74 is in contact with the conducting plate 76, and the other end of the spring 74 is in contact with the flange portion 722 of the conducting pin 72. The lead wire 27 is electrically connected to the conducting pin 72 via the conducting plate 76 and the spring 74. By using the conducting plate 76, a contact surface area between the spring 74 and the lead wire 27 can be increased compared to a case in which the lead wire 27 and the spring 74 are directly coupled to each other. Thus, the lead wire 27 and the spring 74 can be electrically connected to each other in a favorable manner using the conducting plate 76.

The handle-side conducting portion 65 of the sub handle 60 is electrically connected to the electrode 61 via the handle-side lead wire 62. The conducting pin 72 biased in the biasing direction DB by the spring 74 comes into contact with the handle-side conducting portion 65, and is electrically connected to the handle-side conducting portion 65. As a result, the electrode 61 and the detection circuit 80 are electrically connected to each other via the connector 70.

The tip end portion 72T of the outside protruding portion 720 is in contact with the handle-side conducting portion 65 of the sub handle 60 in a state in which the outside protruding portion 720 is biased in the biasing direction DB by the spring 74. By adopting this type of configuration, the conducting pin 72 is suppressed or prevented from separating from the handle-side conducting portion 65. Thus, for example, it is possible to suppress or prevent the handle-side conducting portion 65 and the conducting pin 72 from vibrating, due to the machining operation of the grinder 100, and to suppress or prevent the occurrence of chattering.

As described above, the configuration is adopted in which, when screwing together the handle-side coupling portion 67 and the housing-side coupling portion 16, the rotation orbit of the conducting pin 72 overlaps the handle-side conducting portion 65. When attaching the sub handle 60 to the housing 10 by screwing the sub handle 60 and the housing 10 together, in a state in which the conducting pin 72 is in contact with the handle-side conducting portion 65 and is biased by the spring 74, the conducting pin 72 moves over the handle-side conducting portion 65. Thus, using friction between the tip end portion 72T of the conducting pin 72 and the handle-side conducting portion 65, it is possible to remove foreign matter from the surface of the handle-side conducting portion 65, such as an oxide film or the like. As a result, it is possible to suppress or prevent a deterioration in the conductivity between the handle-side conducting portion 65 and the conducting pin 72.

Further, as shown in FIG. 9, the tip end portion 72T of the conducting pin 72 has a curved surface shape. Thus, compared to a case in which the tip end portion 72T is a flat surface, it is possible to suppress or prevent the handle-side conducting portion 65 from being damaged by the tip end portion 72T, even when the conducting pin 72 moves over the handle-side conducting portion 65 as a result of being biased by the spring 74.

A5. Method of Setting Threshold Value

Figure 11:
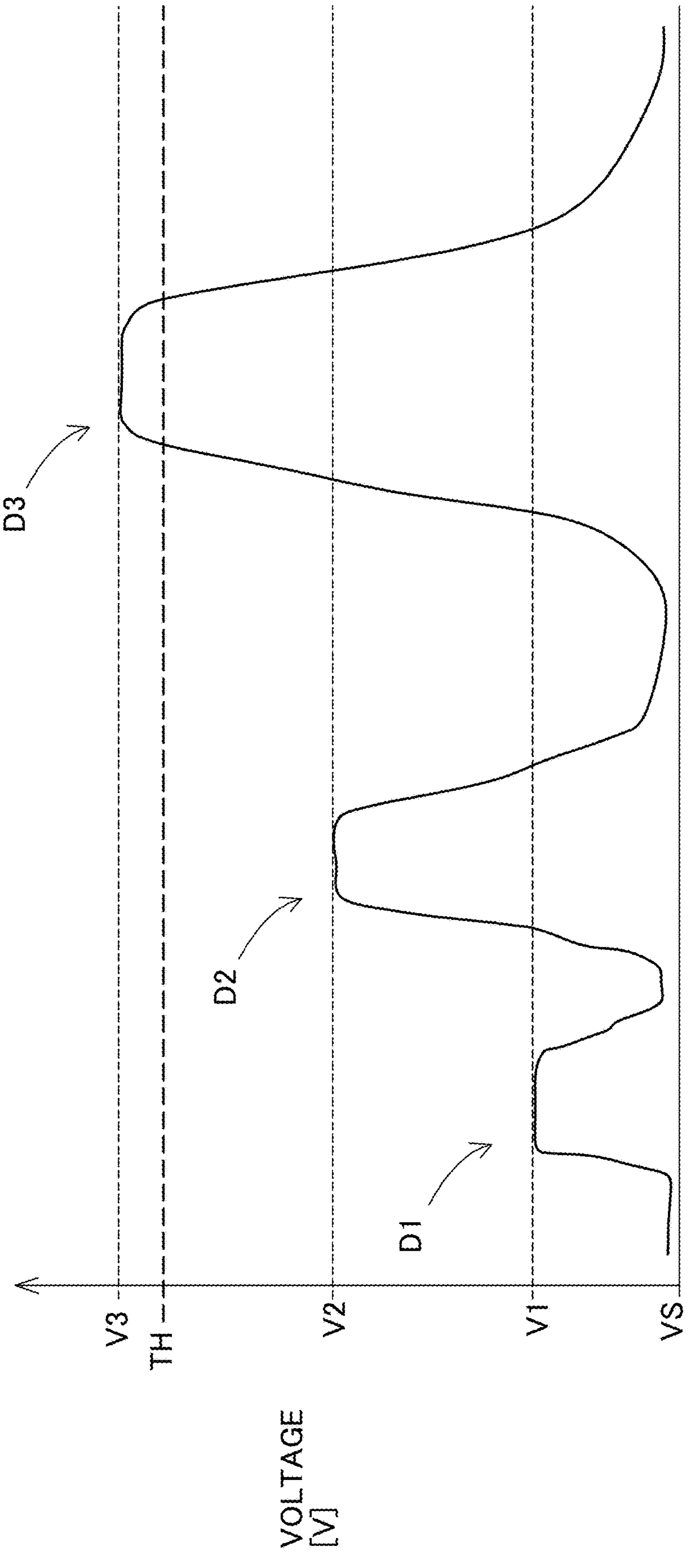
FIG. 11 is an explanatory diagram showing a setting method of threshold values used in a first detection value and a second detection value.

FIG. 11 shows an example of detection results (the sum of the electrostatic capacitance acquired from the electrode 61 and the first detecting portion 271) when the sub handle 60 and the main handle 18 are gripped in three ways. In the example shown in FIG. 11, the vertical axis of the graph shows a voltage.

The left end of the graph shows a detection result D1 in a state in which the main handle 18 is gripped, and the sub handle 60 is not gripped. The detection result D1 is an example of a “first detection result”. In the detection result D1, a peak value of the voltage is a voltage V1.

The center of the graph shows a detection result D2 in a state in which the main handle 18 is not gripped and the sub handle 60 is gripped. The detection result D2 is an example of a “second detection result”. In the detection result D2, a peak value of the voltage is a voltage V2.

As described above, in the present embodiment, the section of the lead wire 27 passing through the main handle 18 is configured to function as the first detecting portion 271. When a surface area of the section of the lead wire 27 passing through the main handle 18, namely, a surface area of the first detecting portion 271, is compared to a surface area of the electrode 61 of the sub handle 60, the surface area of the electrode 61 is larger than the surface area of the first detecting portion 271. Thus, as shown in FIG. 11, the detection sensitivity of the electrostatic capacitance of the first detecting portion 271 is lower than the detection sensitivity of the electrostatic capacitance by the electrode 61. In other words, the voltage V1 is lower than the voltage V2.

The right end of the graph shows a detection result D3 in a state in which both the main handle 18 and the sub handle 60 are gripped. The detection result D3 is an example of a “third detection result”. In the detection result D3, a peak value of the voltage is a voltage V3.

As shown in FIG. 3, in the grinder 100 according to the present embodiment, the electrode 61 of the sub handle 60 and the first detecting portion 271 of the main handle 18 are electrically connected to the detection circuit 80 via the lead wire 27. Thus, the voltage V3 when both the sub handle 60 and the main handle 18 are gripped is substantially equivalent to a sum of the voltage V1 and the voltage V2.

FIG. 11 shows a threshold value TH stored in the memory of the controller 82 according to the present embodiment. The threshold value TH is set using a value greater than the voltage V2 and equal to or lower than the voltage V3 obtained by summing the voltage V1 and the voltage V2. In other words, a configuration is adopted in which only the detection result when both the sub handle 60 and the main handle 18 are gripped is equal to or greater than the threshold value TH. Note that whether or not the detection result has reached the threshold value TH is an example of a “first condition”. When the detection result exceeds the threshold value TH, the controller 82 determines that the first condition has been satisfied, and allows the driving of the motor 20. When only one of the sub handle 60 or the main handle 18 is being gripped, the detection result is less than the threshold value TH. In this case, the controller 82 determines that the first condition has not been satisfied, and does not allow the driving of the motor 20.

A6. Grip Detection Processing

Figure 12:
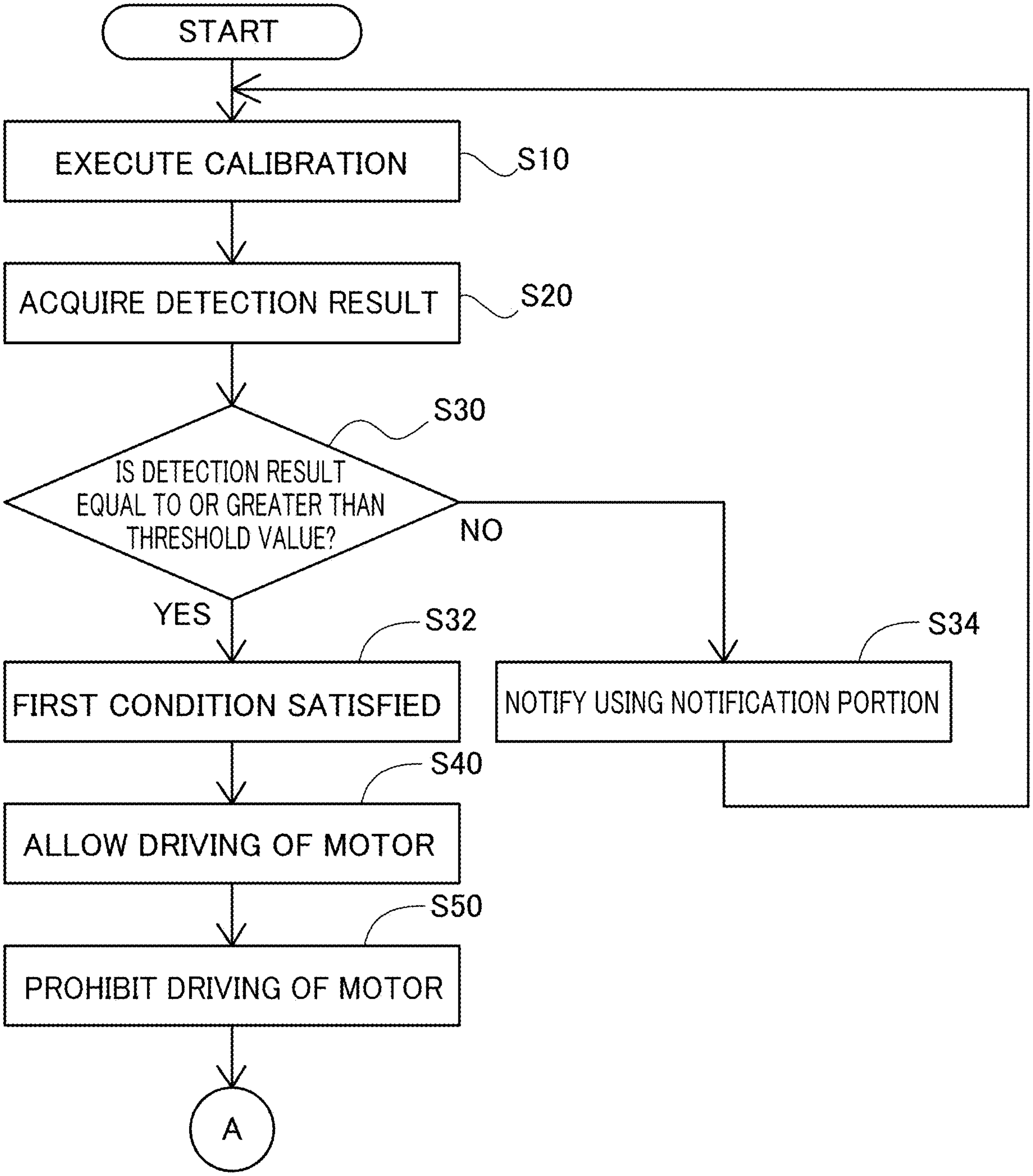
FIG. 12 is a first flowchart showing grip detection processing executed by a controller.
Figure 13:
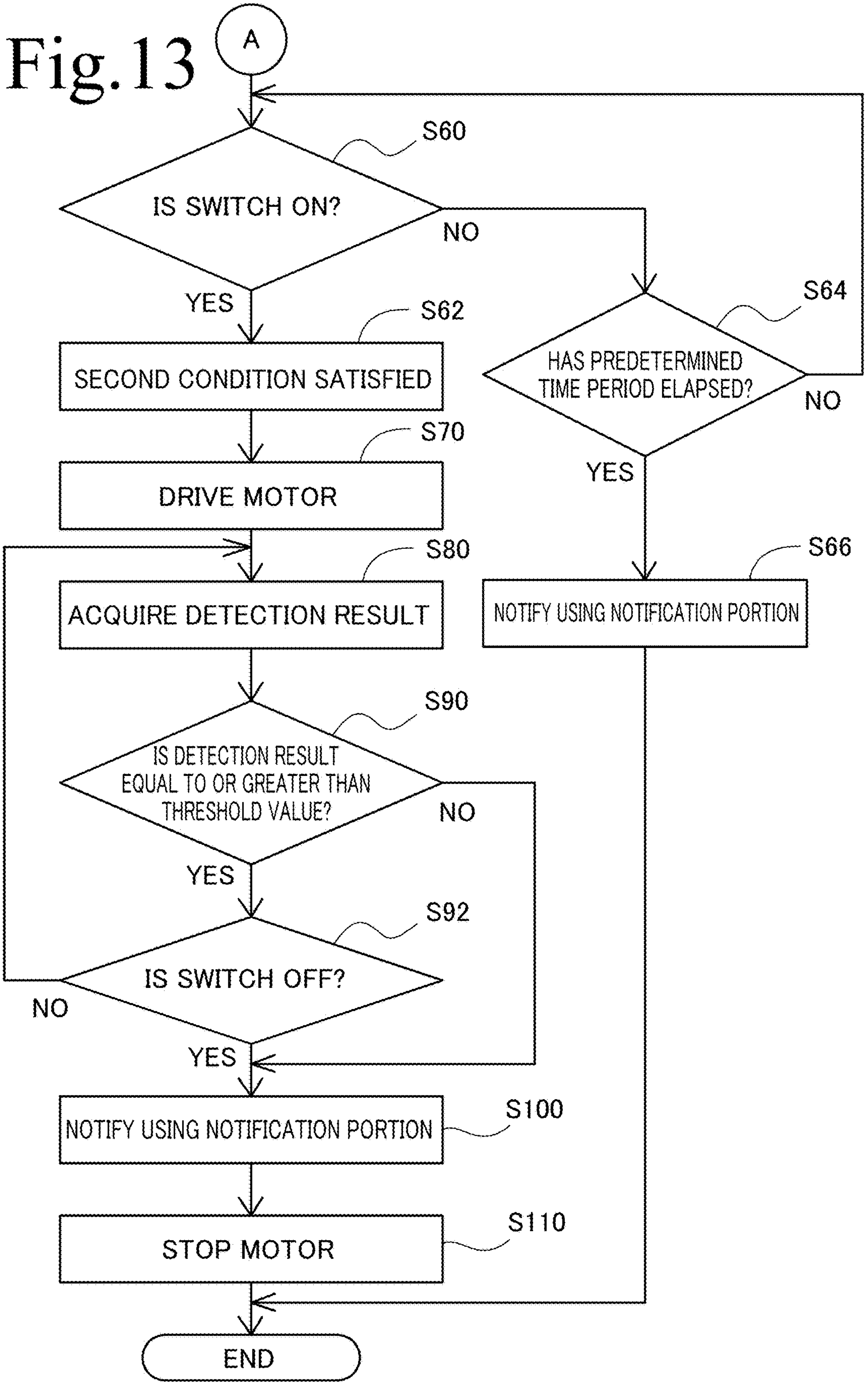
FIG. 13 is a second flowchart showing the grip detection processing executed by the controller.

A flow shown in FIG. 12 and FIG. 13 is started, for example, when the delivery of power to the grinder 100 via the power cord 12 or the rechargeable battery has been started, or when the flow is re-started after the present flow has ended. Note that, in the following description, each of “steps” of the processing will be abbreviated to “S”.

At S10, the controller 82 executes calibration. In the present embodiment, the calibration is processing to adjust the threshold value TH shown in FIG. 11, in order to eliminate noise from the detection result by the electrode 61 and the first detecting portion 271. The controller 82 uses the voltage value acquired from the detection circuit 80 and detects a non-gripped state in which both the sub handle 60 and the main handle 18 are not being gripped. Whether or not it is the non-gripped state can be determined, for example, based on whether or not the acquired voltage value is less than the voltage V1.

When it is determined that it is the non-gripped state, the controller 82 adjusts the threshold value TH using the voltage value acquired in the non-gripped state. For example, the controller 82 adds the voltage value acquired in the non-gripped state, as an offset value including noise or the like, to the threshold value TH, and thus updates the threshold value TH to a new threshold value. In other words, the voltage value detected in the non-gripped state is eliminated as noise. Note that so-called zero-point calibration is included in the adjustment of the threshold value TH. For example, the adjustment of the threshold value TH includes a case in which, instead of changing the threshold value TH, a value obtained by subtracting the voltage value acquired in the non-gripped state from a reference value VS is changed to a new reference value.

Note that, when the calibration is performed in a state in which at least one of the sub handle 60 and the main handle 18 is gripped by the user, there is a possibility that the threshold value TH may be set to be excessively high. Thus, in the present embodiment, the calibration is executed using the detection result in the non-gripped state.

At S20, the controller 82 acquires the voltage value as the detection result from the detection circuit 80. At S30, the controller 82 compares the acquired voltage value with the threshold value TH. When the acquired voltage value is less than the threshold value TH (no at S30), the controller 82 shifts the processing to S34. At S34, the controller 82 prohibits the driving of the motor, and shifts the processing to S10. In this case, the motor 20 is not driven even when the switch knob 19 is moved to the ON position by the user.

At S30, when the acquired voltage value is equal to or greater than the threshold value TH (yes at S30), the controller 82 shifts the processing to S32, and determines that the first condition is satisfied. Note that, in the present embodiment, at S30, the controller 82 also verifies that the second condition is not satisfied. At S40, the controller 82 allows the driving of the motor 20. At S50, the controller 82 illuminates the LED lighting of the notification portion 17. By the illumination of the notification portion 17, the user recognizes that the first condition is satisfied and can recognize that the grinder 100 is in a state in which the motor 20 can be driven by the operation of the switch knob 19.

At S60, the controller 82 monitors whether or not the switch 26 has been turned ON. When the switch 26 is OFF (no at S60), the controller 82 shifts the processing to S64.

At S64, for example, the controller 82 determines whether or not a predetermined time period has elapsed from a time point at which S32 or S40 are executed. When the predetermined time period has not elapsed (no at S64), the controller 82 shifts the processing to S60. When the predetermined time period has elapsed (yes at S64), the controller 82 shifts the processing to S66. At S66, the controller 82 extinguishes the LED lighting of the notification portion 17, and ends the processing. When the predetermined time period has elapsed without the switch knob 19 being operated even in the state in which the sub handle 60 and the main handle 18 are being gripped, there is a possibility that, at that time point, the user does not intend to use the grinder 100. Thus, in this case, the grinder 100 is configured to end the processing without driving the motor 20.

At S60, when it is detected that the switch 26 has been turned ON (yes at S60), the controller 82 shifts the processing to S62 and determines that the second condition is satisfied. At S70, the controller 82 drives the motor 20. As a result of this, the tip tool 91 fixed to the spindle 30 is driven to rotate.

As shown in FIG. 12 and FIG. 13, in the present embodiment, subsequent to verifying at S30 that the second condition is not satisfied, and further determining that the first condition is satisfied at S32, the controller 82 determines whether or not the second condition is satisfied. In other words, when the first condition is satisfied subsequent to the switch 26 being turned ON, the motor 20 is not driven. According to this type of control, for example, the motor 20 is prevented from being driven at a timing at which the gripping of the sub handle 60 is detected subsequent to when the main handle 18 is gripped and the switch knob 19 is turned ON. By adopting this type of configuration, it is possible to prevent the motor 20 from being driven in a state in which the sub handle 60 is not sufficiently gripped.

At S80, the controller 82 acquires the voltage value from the detection circuit 80. In other words, the controller 82 continues the grip detection of the sub handle 60 and the main handle 18 during a period in which the motor 20 is being driven. At S90, the controller 82 compares the acquired voltage value and the threshold value TH. When the acquired voltage value is equal to or greater than the threshold value TH (yes at S90), the controller 82 shifts the processing to S92, and verifies whether or not the switch 26 has been turned OFF. When the switch 26 is ON (no at S92), the controller 82 shifts the processing to S80. When the switch 26 has been turned OFF (yes at S90), the controller 82 shifts the processing to S100.

At S90, when the acquired voltage value is less than the threshold value TH (no at S90), the controller 82 shifts the processing to S100. For example, when at least one of the sub handle 60 and the main handle 18 is no longer being gripped, the voltage value becomes less than the threshold value TH.

At S100, the controller 82 extinguishes the LED lighting of the notification portion 17, and notifies the user that the condition for driving the motor 20 is not satisfied. At S110, the controller 82 stops the motor 20 and ends the processing.

As described above, in the grinder 100 according to the present embodiment, the configuration is adopted in which the first detection result, which indicates the state in which the main handle 18 is being gripped and the sub handle 60 is not being gripped, is smaller than the second detection result, which indicates the state in which the main handle 18 is not being gripped and the sub handle 60 is being gripped. In other words, the detection sensitivity of the gripping of the sub handle 60 is higher than the detection sensitivity of the gripping of the main handle 18. Thus, it is possible to detect whether or not the sub handle 60 is being sufficiently gripped using a simpler configuration than a mode in which a mechanical switch, such as a switch knob, is provided on the sub handle 60. Further, the gripping of the sub handle 60 and the main handle 18 is configured to be detected by comparing the sum of the first detection result and the second detection result with the threshold value TH. Thus, the gripping of the sub handle 60 and the main handle 18 can be detected using a simpler method than a mode in which the gripping of the main handle 18 and the gripping of the sub handle 60 are independently determined.

The grinder 100 according to the present embodiment is provided with the connector 70 that includes the main body portion 71 having the insulating properties, and the conducting pin 72 that is attached to the main body portion 71 and that is electrically connected to the detection circuit 80. In the state in which the handle-side coupling portion 67 of the sub handle 60 is coupled to the housing-side coupling portion 16 of the housing 10, the handle-side conducting portion 65 is electrically connected to the conducting pin 72 of the connector 70, and the conducting pin 72 is electrically insulated from the housing-side coupling portion 16, by the main body portion 71. Thus, in the state in which the sub handle 60 is coupled to the housing 10, the electrode 61 is electrically connected to the detection circuit 80 via the connector 70. Further, since the conducting pin 72 is insulated by the main body portion 71, it is possible to suppress or prevent a short circuit from occurring with the electrode 61 at connection locations the handle-side coupling portion 67 and the housing-side coupling portion 16. As a result, it is possible to suppress or prevent a deterioration in the detection sensitivity of the gripping of the sub handle 60 and the main handle 18.

Further, in the power tool, as a non-limiting object [of the present disclosure], the following aspects B1 to B10 are provided, to provide a technology that can detect whether or not both a main handle and a sub handle are being gripped, using a simple configuration. The following aspects B1 to B10 can be adopted as any one of the single aspects, or as a combination of two or more of the aspects B1 to B10. Alternatively, at least one of the following aspects B1 to B10 can be combined with at least one of the features described in the grinder 100 of the embodiment, the above-described modified examples, and each of the claims.

Aspect B1

A power tool including a motor driven by electric power, a main handle configured to be grippable by one hand of a user, the main handle including a first detecting portion capable of detecting a first detection value in accordance with the gripping, a sub handle configured to be grippable by another hand of the user, the sub handle including a second detecting portion capable of detecting a second detection value in accordance with the gripping, a detection circuit configured to acquire the first detection value from the first detecting portion and the second detection value from the second detecting portion, and configured to output a detection result related to the acquired first detection value and second detection value, and a controller configured to acquire the detection result from the detection circuit, and allow driving of the motor when a first condition is satisfied, the first condition being that the acquired detection result is equal to or greater than a threshold value, wherein a first detection result is smaller than a second detection result, the first detection result being the detection result in a state in which the main handle is gripped and the sub handle is not gripped, and the second detection result being the detection result in a state in which the main handle is not gripped and the sub handle is gripped, and the threshold value is larger than the second detection result and is equal to or less than a sum of the first detection result and the second detection result.

According to the power tool according to Aspect B1, a detection sensitivity of the sub handle is set to be higher than a detection sensitivity of the main handle, and at the same time, it is detected whether both of the handles are being gripped by comparing the sum of the first detection result and the second detection result with the threshold value. Thus, it is possible to detect the gripping of the sub handle and of the main handle using a simpler method than a mode in which the gripping of the main handle and the gripping of the sub handle are individually determined, while setting the detection sensitivity of the gripping of the sub handle to be higher than the detection sensitivity of the gripping of the main handle.

Aspect B2

The power tool according to Aspect B1, wherein the first detecting portion and the second detecting portion are configured to be able to acquire an electrostatic capacitance, and a surface area of the second detecting portion is larger than a surface area of the first detecting portion.

According to Aspect B2, it is possible to cause the detection sensitivity of the second detecting portion to be higher than the detection sensitivity of the first detecting portion, using a simple configuration.

Aspect B3

The power tool according to Aspect B1 or Aspect B2, wherein the first detecting portion is disposed on a connection path electrically connecting the second detecting portion and the detection circuit.

According to Aspect B3, both the first detecting portion and the second detecting portion are provided on the single connection path, and thus it is possible to electrically connect the main handle and the sub handle to the detection circuit using a simpler configuration than a case in which the first detecting portion is separately connected to the second detecting portion and the detection circuit via a plurality of connection paths.

Aspect B4

The power tool according to Aspect B3, wherein the second detecting portion and the detection circuit are electrically connected by a lead wire, the lead wire is disposed passing through the main handle, and a section, of the lead wire, passing through the main handle is configured to function as the first detecting portion.

According to Aspect B4, it is possible to detect the gripping of the main handle using a simple configuration in which a part of the lead wire disposed inside the main handle functions as the first detecting portion.

Aspect B5

The power tool according to any one of Aspect B1 to Aspect B4, wherein the main handle includes an operation portion configured to switch between an ON state and an OFF state, and the controller drives the motor when, in addition to the first condition, a second condition is further satisfied, the second condition being that the operation portion is in the ON state.

According to Aspect B5, since the motor is driven when the gripping of the main handle and the sub handle is detected and, further, the operation portion is in the ON state, it is possible to suppress or prevent the motor from being driven in a state in which one of the main handle and the sub handle is insufficiently gripped.

Aspect B6

The power tool according to Aspect B5, wherein the main handle is a cylindrical portion having a long axis, and in a plane orthogonal to the long axis, the first detecting portion is disposed in a region on an opposite side to the operation portion, with the long axis interposed therebetween.

According to Aspect B6, compared to a case in which the first detecting portion is disposed close to the operation portion, it is possible to detect a state in which the cylindrical main handle is being reliably gripped.

Aspect B7

The power tool according to any one of Aspect B1 to Aspect B6, further including a housing configured to house the motor, wherein the sub handle includes a grip portion grippable by the user, the sub handle is configured to be attached to and detached from the housing, and the second detecting portion is configured to be able to detect the second detection value over an entire circumference of the grip portion.

According to Aspect B7, when fixing the sub handle to a predetermined position of the housing, even when the sub handle has a different orientation and posture each time the sub handle is attached and detached, it is possible to detect the gripping of the sub handle regardless of an orientation and posture of the grip portion with respect to the housing.

Aspect B8

The power tool according to any one of Aspect B1 to Aspect B7, wherein using the detection result acquired from the detection circuit, the controller detects a non-grip state in which the main handle and the sub handle are not being gripped, and the controller determines whether or not the first condition is satisfied after adjusting the threshold value using the detection result acquired in the non-grip state.

According to Aspect B8, it is possible to eliminate, as noise, the detection result detected in the non-grip state, and to suppress or prevent a deterioration in a detection accuracy of the grip detection of the main handle and the sub handle.

Aspect B9

The power tool according to any one of Aspect B1 to Aspect B8, wherein the power tool is a grinder including a housing that houses the motor, a plurality of connectors configured to be able to attach and detach the sub handle are provided at a plurality of positions of the housing, and when the sub handle is attached to any one of the plurality of connectors, the second detecting portion is electrically connected to the detection circuit.

According to Aspect B9, even when the power tool is a power tool, such as the grinder, with which an attachment position of the sub handle is easily changed in order to switch the orientation of the housing during use by the user, the gripping of the sub handle can be detected for each of the attachment positions of the sub handle.

Aspect B10

The power tool according to any one of Aspect B1 to Aspect B9, further including a notification portion configured to notify the user whether or not the acquired detection result satisfies the first condition.

According to Aspect B10, the user can recognize that the first condition is satisfied, using the notification portion.

B. OTHER EMBODIMENTS

The above-described embodiment is simply an example, and the power tool according to the present disclosure and to Aspect B1 to B10 described above is not limited to the grinder 100 of the above-described embodiment. For example, changes exemplified below in a non-limiting manner are possible. Further, at least one of those changes can be adopted in combination with at least one of the grinder 100 of the embodiment, and the features described in the claims.

(B1) In the above-described first embodiment, the example is described of the configuration in which the lead wire 27 passes through the main handle 18. In contrast to this, the lead wire 27 need not necessarily pass through the main handle 18, and a part of the lead wire 27 may be disposed in only a part of the main handle 18. For example, even when the detection circuit 80 is disposed at a center portion of the main handle 18, or when the detection circuit 80 is disposed further to the front than the motor 20, the lead wire 27 can be caused to function as the first detecting portion 271.

(B2) In the above-described first embodiment, the example is described of the configuration in which the single lead wire connected to the detection circuit 80 branches from the wiring connection position 27C into the two lead wires toward each of the connectors 70L and 70R. In contrast to this, the lead wire 27 may include two lead wires, namely a lead wire joining the connector 70R to the detection circuit 80, and a lead wire joining the connector 70L to the detection circuit 80. In this case, by disposing the two lead wires to pass through the main handle 18, respectively, it is possible to provide the first detecting portion 271 at a plurality of positions in the main handle 18. In this case, detection values of both of the two lead wires may be used for the first detection value, or the detection value of one of the lead wires selected as wished from the two lead wires may be used.

(B3) In the above-described first embodiment, the example is described in which the grip detection of the sub handle 60 and the main handle 18 is executed, but the grip detection may be further executed for a position other than the sub handle 60 and the main handle 18. In this case, a lead wire is added at a desired position for the grip detection, and the added lead wire is connected to the lead wire 27R. It is possible to increase a number of positions for the grip detection using a simple configuration of adding the lead wire.

For example, assuming a case in which the orientation of the housing 10 is switched when using the power tool in accordance with the type of the tip tool 91, as with the grinder 100, there is a possibility that the grip position of the main handle 18 by the user is switched. In this case, the first detecting portion 271 is preferably provided at the plurality of positions in the main handle 18. For example, in addition to the lead wire 27R disposed on the right side of the main handle 18, a lead wire is further disposed at the upper side of the main handle 18. By adopting this type of configuration, even when the grip position by the user switches to the right side and the upper side of the main handle 18, the gripping of the main handle 18 can be detected.

(B4) In the above-described first embodiment, the example is described in which the detection circuit 80 is disposed in the rear end portion of the housing 10, and the main handle 18 and the first detecting portion 271 are disposed between the detection circuit 80 and the sub handle 60. In contrast to this, the detection circuit 80 may be disposed in the central portion or in the front end portion of the housing 10, and the main handle 18 and the first detecting portion 271 may be disposed further to the rear than the detection circuit 80. In this case, for example, a lead wire connected to the detection circuit 80 branches into a lead wire disposed extending to the connector 70 and the sub handle 60, and a lead wire disposed extending from the detection circuit 80 to the first detecting portion 271 further to the rear than the detection circuit 80. Even when adopting this type of configuration, the same effects as those of the above-described first embodiment can be obtained.

(B5) In the above-described first embodiment, the example is described in which the electrode 61 provided in the sub handle 60 and the first detecting portion 271 provided in the main handle 18 acquire the electrostatic capacitance, and the grip detection processing is performed using, as the detection result, the voltage value to which the acquired electrostatic capacitance is converted. In contrast to this, in the grip detection processing, the second detecting portion and the first detecting portion may acquire a detection value other than the electrostatic capacitance, as long as the detection sensitivity of the second detecting portion is higher than that of the first detecting portion. For example, each of the first detecting portion and the second detecting portion may be a force sensing resistor (FSR). In this case, as a detection value, the detection circuit 80 acquires, from the first detecting portion and the second detecting portion, changes in voltage based on changes in a resistance value generated by pressure when gripping the handle. Further, the detection circuit 80 may acquire, as the first detection value and the second detection value, a physical amount other than the electrostatic capacitance or the voltage, such as a pressure or the like. The pressure and the voltage are examples of the "first detection value" and the "second detection value".

(B6) In the above-described first embodiment, the example is described in which the electrode 61 having the substantially circular cylindrical shape extending along the long axis HX functions as the second detecting portion. In contrast to this, as long as the detection sensitivity of the second detecting portion is higher than that of the first detecting portion, the second detecting portion may be an electrode having a shape other than the circular cylindrical shape, such as a plate shape extending along the long axis HX, or may be an electrode that is a rod-shaped member having a substantially circular pillar shape extending along the long axis HX. Further, instead of the electrode, the second detecting portion may be the lead wire 27 or the like wound a plurality of times.

(B7) In the above-described first embodiment, the example is described in which the section of the lead wire 27 passing through the main handle 18 functions as the first detecting portion 271. In contrast to this, as long as the detection sensitivity of the second detecting portion is higher than that of the first detecting portion, a member other than the lead wire 27 may be adopted as the first detecting portion 271, such as an electrode having a smaller surface area than the surface area of the electrode 61 of the sub handle 60, for example. The electrode may have any desired shape, such as a circular cylindrical shape, a circular pillar shape, a plate shape, a rod-shaped member, or the like.

(B8) In each of the above-described embodiments, the example is described in which the controller 82 is configured by a computer including the CPU, the ROM, the RAM, and the like. In contrast to this, the controller 82 may be configured by programmable logic devices, such as an application specific integrated circuit (ASIC), a field programmable gate array (FPGA), and the like. Drive control processing of each of the above-described embodiments may be realized by the CPU executing a program stored in the ROM. In this case, the program may be stored in advance in the ROM of the controller 82, or when the controller 82 includes a non-volatile memory, the program may be stored in the non-volatile memory. Alternatively, the program may be stored in an external storage medium (a USB memory, for example) that can read data. The drive control processing of the above-described embodiment and modified examples may be performed by distributed processing using a plurality of control circuits.

The present disclosure is not limited to the above-described embodiment, and can be realized by various configurations insofar as they do not depart from the gist and scope of the present disclosure. For example, technological features in the embodiments corresponding to technological features in each of modes listed in the Summary of the invention can be switched or combined as appropriate, in order to resolve some or all of the above-described problems, or in order to achieve some or all of the above-described effects. Further, those technological features can be omitted as appropriate insofar as they are not described as being essential in the present specification.

10 Housing, 11 Motor housing, 11T Upper side apex, 12 Power cord, 15 Gear housing, 15T Upper side apex, 16 Housing-side coupling portion, 17 Notification portion, 18 Main handle, 19 Switch knob, 20 Motor, 21 Output shaft, 22 Drive bevel gear, 26 Switch, 27, 27L, 27R Lead wire, 27C Wiring connection position, 30 Spindle, 32 Driven bevel gear, 60 Sub handle, 61 Electrode, 62 Handle-side lead wire, 64 Insulating portion, 64F Flange portion, 64T Tip end portion, 65 Handle-side conducting portion, 66 Support body, 66B Bottom portion, 66R Recess portion, 66T Tip end portion, 66W Wall portion, 67 Handle-side coupling portion, 68 Main body portion, 70, 70L, 70R Connector, 71 Main body portion, 71L, 71R Region, 72 Conducting pin, 72T Tip end portion, 72X long axis, 74 Spring, 76 Conducting plate, 80 Detection circuit, 82 Controller, 91 Tip tool, 92 Wheel cover, 100 Electric disc grinder, 271 First detecting portion, 710 Plate portion, 710B Bottom surface, 710T Facing surface, 711 Through hole, 712 Storage portion, 712B Bottom wall, 712L, 712R Side wall, 713 Through hole, 714 Through hole, 715 Recess portion, 716 Storage space, 720 Outside protruding portion, 722 Flange portion, 722T Surface, 724 Inside protruding portion, CL Clearance, DB Biasing direction, DX Drive shaft, HX Long axis, RX Rotational axis

The invention claimed is:

1. A power tool comprising:

a housing including at least one housing-side coupling portion having conductive properties;

a handle configured to be gripped by a user, the handle including a handle-side coupling portion detachably coupled to the at least one housing-side coupling portion, the handle-side coupling portion having conductive properties, a detecting portion capable of detecting a detection value, a handle-side conducting portion electrically connected to the detecting portion, and an insulating portion electrically insulating the handle-side coupling portion from the handle-side conducting portion; and at least one connector, the at least one connector including a main body portion configured to be fixable to the housing, the main body portion having insulating properties, and a housing-side conducting portion attached to the main body portion and electrically connected to a detection circuit, the detection circuit acquiring the detection value from the detecting portion, wherein in a state in which the handle-side coupling portion and the at least one housing-side coupling portion are coupled to each other, the handle-side conducting portion is electrically connected to the housing-side conducting portion, and the housing-side conducting portion is electrically insulated from the at least one housing-side coupling portion by the main body portion.

2. The power tool according to claim 1, wherein in the state in which the handle-side coupling portion and the at least one housing-side coupling portion are coupled to each other, the handle-side conducting portion is provided at a position facing a surface of the main body portion, and the at least one connector further includes a biasing member configured to bias the housing-side conducting portion to protrude from the surface of the main body portion toward the handle-side conducting portion.

3. The power tool according to claim 2, wherein the at least one connector further includes a plate housed in the main body portion and having conductive properties, the plate is electrically connected to the detection circuit, the biasing member has conductive properties, is disposed on the plate, and electrically connects the housing-side conducting portion and the plate, and as a result of the biasing member biasing the housing-side conducting portion in a direction separating from the plate, the housing-side conducting portion is configured to protrude from the surface of the main body portion toward the handle-side conducting portion.

4. The power tool according to claim 3, wherein the handle-side coupling portion is a male screw or a female screw, the at least one housing-side coupling portion is a male screw or a female screw configured to be screwable together with the handle-side coupling portion, and the handle-side conducting portion has an annular shape disposed surrounding the handle-side coupling portion in a state of being separated from the handle-side coupling portion.

5. The power tool according to claim 4, wherein the handle-side conducting portion is disposed at a position separated from a surface of the housing, in the state in which the handle-side coupling portion and the at least one housing-side coupling portion are coupled to each other.

6. The power tool according to claim 5, wherein the at least one connector includes a plurality of connectors, the at least one housing-side coupling portion includes a plurality of housing-side coupling portions, and the main body portions of the respective plurality of connectors are provided at positions corresponding to the respective plurality of housing-side coupling portions.

7. The power tool according to claim 6, wherein a part of the housing-side conducting portion is housed in the main body portion, and the main body portion includes a plurality of through holes, a lead wire being insertable through the plurality of through holes, and the lead wire electrically connecting the part of the housing-side conducting portion housed in the main body portion to the detection circuit.

8. The power tool according to claim 7, wherein the housing-side conducting portion is a metal pin having a long axis, the main body portion has a plane-symmetrical shape with respect to a plane including the long axis, and the plurality of through holes includes two through holes respectively disposed in two regions divided by the plane including the long axis.

9. The power tool according to claim 8, wherein in the state in which the handle-side coupling portion and the at least one housing-side coupling portion are coupled to each other, the handle-side conducting portion is provided at a position facing the surface of the main body portion, the at least one connector further includes a biasing member configured to bias the housing-side conducting portion to protrude from the surface of the main body portion toward the handle-side conducting portion, and a tip end of the housing-side conducting portion has a curved surface shape.

10. The power tool according to claim 2, wherein a tip end of the housing-side conducting portion has a curved surface shape.

11. The power tool according to claim 1, wherein the handle-side coupling portion is a male screw or a female screw, the at least one housing-side coupling portion is a male screw or a female screw configured to be screwable together with the handle-side coupling portion, and the handle-side conducting portion has an annular shape disposed surrounding the handle-side coupling portion in a state of being separated from the handle-side coupling portion.

12. The power tool according to claim 1, wherein the handle-side conducting portion is disposed at a position separated from a surface of the housing, in the state in which the handle-side coupling portion and the at least one housing-side coupling portion are coupled to each other.

13. The power tool according to claim 1, wherein the at least one connector includes a plurality of connectors, the at least one housing-side coupling portion includes a plurality of housing-side coupling portions, and the main body portions of the respective plurality of connectors are provided at positions corresponding to the respective plurality of housing-side coupling portions.

14. The power tool according to claim 1, wherein a part of the housing-side conducting portion is housed in the main body portion, and the main body portion includes a plurality of through holes, a lead wire being insertable through the plurality of through holes, and the lead wire electrically connecting the part of the housing-side conducting portion housed in the main body portion to the detection circuit.

15. The power tool according to claim 14, wherein the housing-side conducting portion is a metal pin having a long axis, the main body portion has a plane-symmetrical shape with respect to a plane including the long axis, and the plurality of through holes includes two through holes respectively disposed in two regions divided by the plane including the long axis.

* * * * *